(12) United States Patent
Taylor et al.

(10) Patent No.: US 12,007,267 B2
(45) Date of Patent: Jun. 11, 2024

(54) DISPENSING SYSTEM WITH RELEASABLY CONNECTED METERING SYSTEMS

(71) Applicant: NORDSON CORPORATION, Westlake, OH (US)

(72) Inventors: Scott B. Taylor, Whitmore Lake, MI (US); Justin Hall, Novi, MI (US); Timothy C. Campbell, Waterford, MI (US)

(73) Assignee: Nordson Corporation, Westlake, OH (US)

( * ) Notice: Subject to any disclaimer, the term of this patent is extended or adjusted under 35 U.S.C. 154(b) by 300 days.

(21) Appl. No.: 17/609,458

(22) PCT Filed: May 14, 2020

(86) PCT No.: PCT/US2020/032885
§ 371 (c)(1),
(2) Date: Nov. 8, 2021

(87) PCT Pub. No.: WO2020/232245
PCT Pub. Date: Nov. 19, 2020

(65) Prior Publication Data
US 2022/0228895 A1   Jul. 21, 2022

Related U.S. Application Data

(60) Provisional application No. 62/848,408, filed on May 15, 2019.

(51) Int. Cl.
*G01F 3/18* (2006.01)
*G01F 15/18* (2006.01)

(52) U.S. Cl.
CPC .............. *G01F 3/18* (2013.01); *G01F 15/185* (2013.01)

(58) Field of Classification Search
CPC ................................. G01F 3/18; G01F 15/185
(Continued)

(56) References Cited

U.S. PATENT DOCUMENTS 5,513,779 A    5/1996  Reich
9,528,904 B1  12/2016  Cronin et al.
(Continued)

FOREIGN PATENT DOCUMENTS

DE    20314725 U1    11/2003
FR     2361634 A1     3/1978
WO  2010/109182 A1    9/2010

OTHER PUBLICATIONS

IPEA/409—International Preliminary Report on Patentability Mailed on Nov. 25, 2021 for WO Application No. PCT/US20/032885.
(Continued)

*Primary Examiner* — Nathaniel T Woodward
(74) *Attorney, Agent, or Firm* — BakerHostetler

(57) ABSTRACT

A dispensing system includes a first metering system including a first housing, a first metering rod at least partially disposed within the first housing, and a first assembly defining a first metering chamber and releasably connected to the first housing. The first metering rod linearly translates through the first metering chamber so as to dispense a discrete amount of a first material from the first metering chamber. The dispensing system also includes a second metering system including a second housing, a second metering rod at least partially disposed within the second housing, and a second assembly defining a second metering chamber and releasably connected to the second housing. The second metering rod linearly translates through the second metering chamber so as to dispense a discrete amount of a second material from the second metering
(Continued)

chamber. The first metering system is releasably connected to the second metering system.

20 Claims, 15 Drawing Sheets

(58) Field of Classification Search
USPC .......................................................... 73/239
See application file for complete search history.

(56) References Cited

U.S. PATENT DOCUMENTS

| | | |
|---|---|---|
| 2009/0101673 A1 | 4/2009 | Alioto et al. |
| 2012/0247612 A1 | 10/2012 | Beebe |
| 2014/0257179 A1 | 9/2014 | Schwab et al. |
| 2016/0067656 A1* | 3/2016 | Britcher ................ B01F 25/105 222/145.5 |

OTHER PUBLICATIONS

ISA/220—Notification of Transmittal or Search Report and Written Opinion of the ISA, or the Declaration Mailed on Jul. 31, 2020 for WO Application No. PCT/US20/032885.

* cited by examiner

DISPENSING SYSTEM WITH RELEASABLY CONNECTED METERING SYSTEMS

CROSS-REFERENCE TO RELATED APPLICATIONS

This application is a National Stage Application of International Patent App. No. PCT/US2020/032885, filed May 14, 2020, which claims the benefit of U.S. Provisional Patent App. No. 62/848,408, filed May 15, 2019, the entire disclosures of both of which are hereby incorporated by reference as if set forth in their entirety herein.

TECHNICAL FIELD

The present disclosure generally relates to dispensing systems, and, more particularly, to a dispensing system including releasably connected first and second metering systems.

BACKGROUND

Metering and dispensing systems are used to emit a discrete amount of a particular material for dispensing on a substrate or storage in an appropriate container. Some such dispensing systems include the ability to meter and mix multiple types of materials in predetermined, accurate ratios. There are many applications for such a system, such as in the medical, automotive, or electronic fields. Typically, in systems where multiple materials must be metered and dispensed, multiple discrete metering systems are required. As a result, such dispensing systems require a greater number of parts, which requires a larger working inventory, increases servicing difficulty, and can decrease productivity. Additionally, servicing of such metering systems typically requires removing the system from the mounting position and disassembly elsewhere, further adding to operational costs and maintenance time. Also, when different material amounts are required, typically an operator of a dispensing system must replace the currently used metering system with a different metering system specially designed to dispense the desired material amount.

Therefore, there is a need for a dispensing system that incorporates multiple metering systems, and where portions of each of the metering system can be replaced or repaired without requiring removal of the entire metering system from the mounting location.

SUMMARY

An embodiment of the present disclosure is a dispensing system including a first metering system. The first metering system includes a first housing, a first metering rod at least partially disposed within the first housing, and a first assembly defining a first metering chamber and releasably connected to the first housing. The first metering rod is configured to linearly translate through the first metering chamber so as to dispense a discrete amount of a first material from the first metering chamber. The dispensing system also includes a second metering system including a second housing, a second metering rod at least partially disposed within the second housing, and a second assembly defining a second metering chamber and releasably connected to the second housing. The second metering rod is configured to linearly translate through the second metering chamber so as to dispense a discrete amount of a second material from the second metering chamber, and the first metering system is releasably connected to the second metering system.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
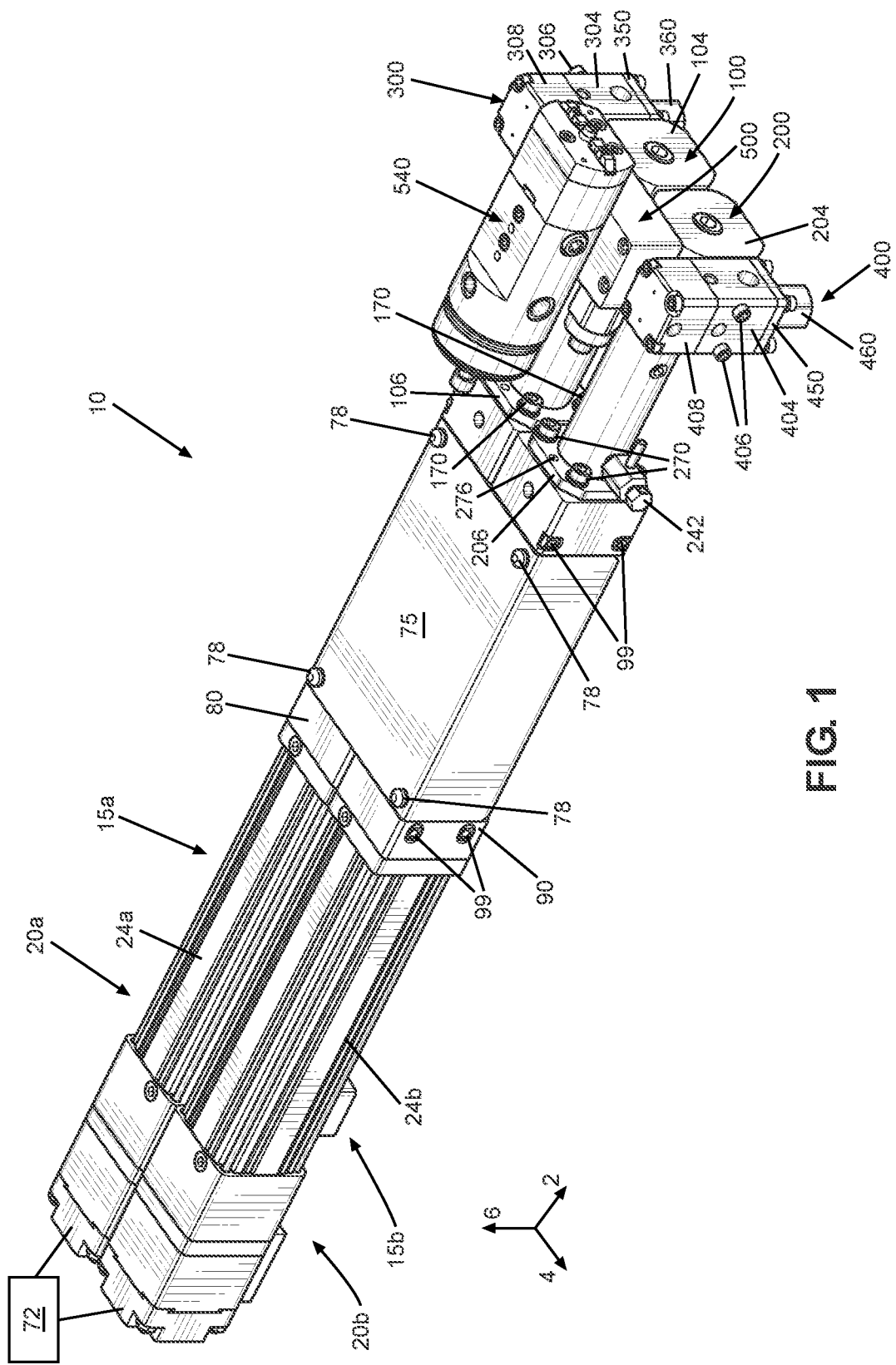
FIG. 1 illustrates a perspective view of a dispensing system according to an embodiment of the present disclosure.

Described herein is a dispensing system 10 that includes first and second metering systems 15a, 15b for metering shots of first and second materials, respectively. Certain terminology is used to describe the dispensing system 10 in the following description for convenience only and is not limiting. The words "right", "left", "lower," and "upper" designate directions in the drawings to which reference is made. The words "inner" and "outer" refer to directions toward and away from, respectively, the geometric center of the description to describe the dispensing system 10 and related parts thereof. The words "upstream" and "downstream" refer to directions along the flow of material in relation to a particular component of the dispensing system 10. The words "forward" and "rearward" refer to directions in a longitudinal direction 2 and a direction opposite the longitudinal direction 2 along the dispensing system 10 and related parts thereof. The terminology includes the above-listed words, derivatives thereof and words of similar import.

Unless otherwise specified herein, the terms "longitudinal," "vertical," and "lateral" are used to describe the orthogonal directional components of various components of the dispensing system 10, as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Figure 2:
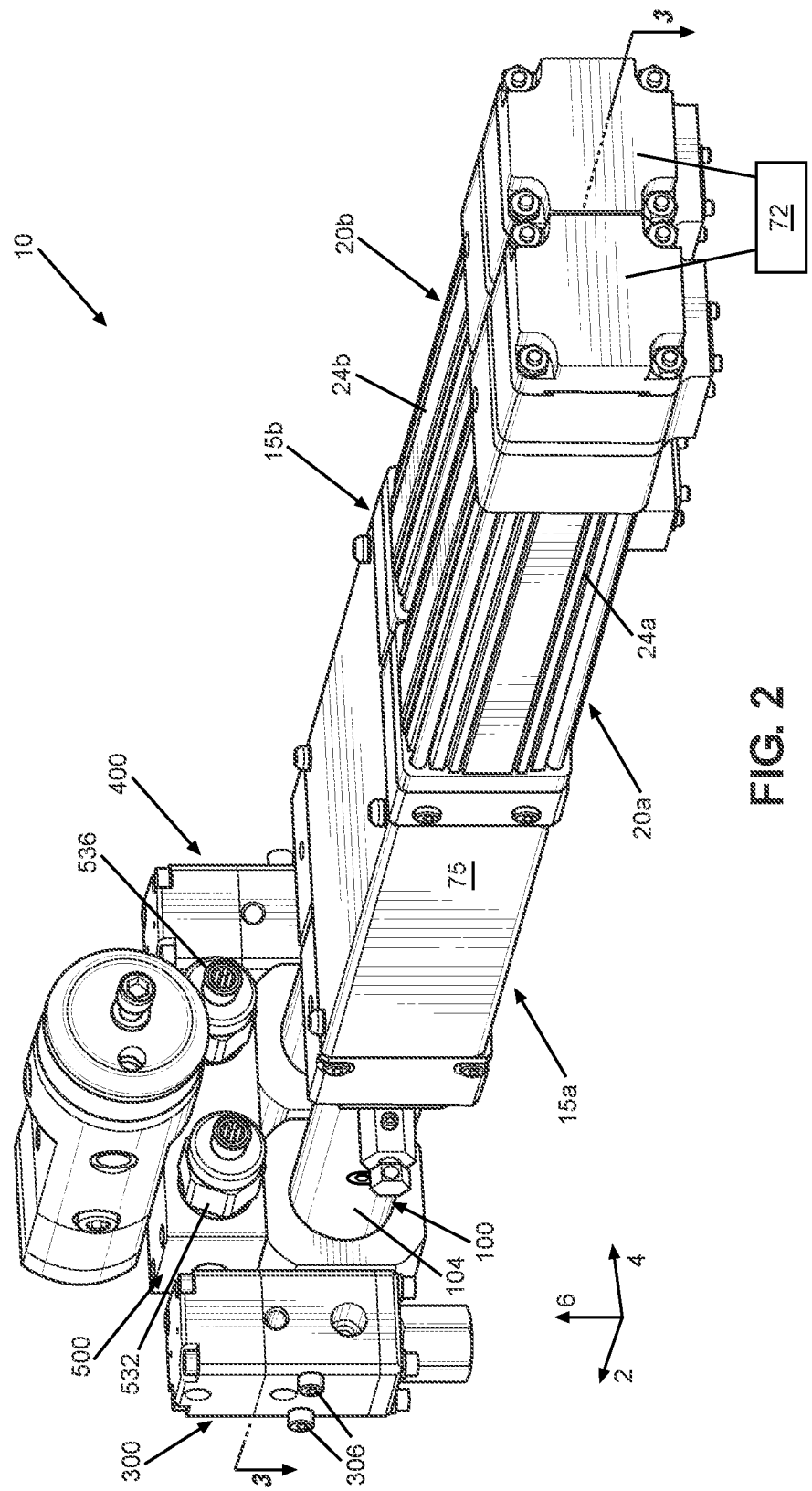
FIG. 2 illustrates an alternative perspective view of the dispensing system shown in FIG. 1.
Figure 3:
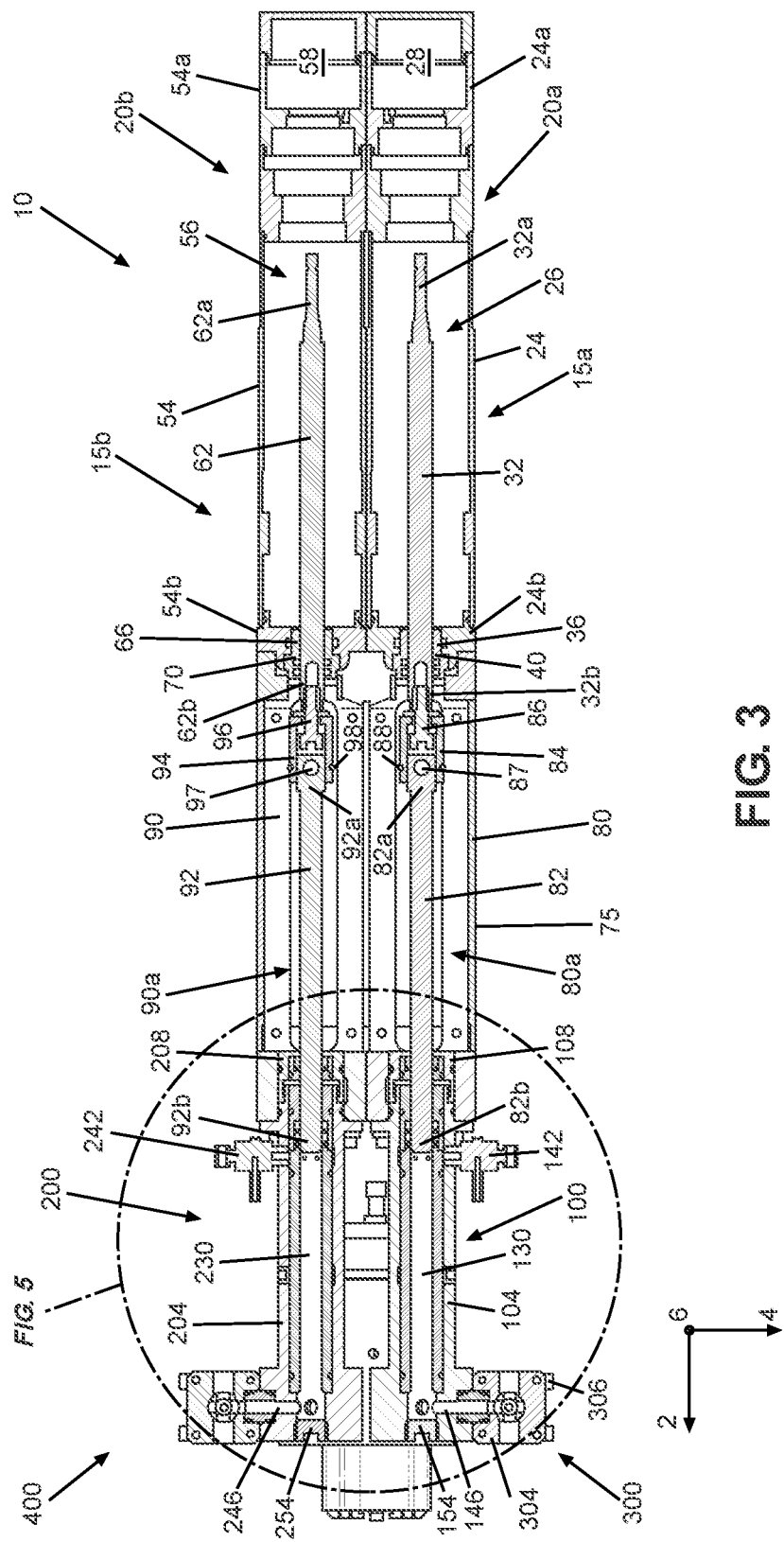
FIG. 3 illustrates a cross-sectional view of the dispensing system shown in FIG. 1, taken along line 3-3 shown in FIG. 2.

Referring to FIGS. 1-3, a dispensing system 10 for metering and dispensing first and second materials is shown. The dispensing system 10 can be utilized in a wide variety of applications, and as such the first and second materials can be acrylic, epoxy, silicone, grease, adhesive, urethane, PVC, varnish, etc. Though typically the first and second materials are different, the dispensing system 10 can be utilized in applications where the first and second materials are the same. The dispensing system 10 can include first and second metering systems 15a, 15b, where the first and second metering systems 15a, 15b can be releasably connected to each other, as will be described below.

The first metering system 15a can include a linear actuator 20a configured to linearly translate a metering rod 82, which will be described further below. The linear actuator 20a can include a housing 24 that extends from a first end 24a to a second end 24b opposite the first end 24a along the longitudinal direction 2. The housing 24 can be substantially hollow, such that the housing 24 defines a cavity 26 configured to contain the operational components of the linear actuator 20a. For example, an actuation module 28 of the linear actuator 20a can be disposed within the cavity 26 of the housing 24 at the first end 24a. The actuation module 28 can comprise any suitable type of linear actuation device, such as a planetary ball screw, non-planetary ball screw, hydraulic cylinder, pneumatic cylinder, rack and pinion, etc. A rod 32 can extend from the actuation module 28, such that that actuation module 28 is configured to linearly translate the rod 32 along the longitudinal direction 2. The rod 32 can extend along the longitudinal direction 2 from a first end 32a to a second end 32b opposite the first end 32a along the longitudinal direction 2. The rod 32 can be attached to the actuation module 28 at the first end 32a, whereas the second end 32b of the rod 32 can be operably attached to the metering rod 82. The second end 24b of the housing 24 can define a passage 36 extending therethrough, where the passage 36 can extend substantially along the longitudinal direction 2. A bearing 40 can be disposed within the passage 36, and the rod 32 can extend through the bearing 40. The bearing 40 can be configured to guide the rod 32 and enable linear movement of the rod 32 along the longitudinal direction 2.

Similarly, the second metering system 15b can include a second linear actuator 20b configured to linearly translate a metering rod 92. Though the second metering system 15b will be described as similar to the first metering system 15a in many ways, it is contemplated that any number of differences can exist in operation between the first and second metering systems 15a, 15b. The second linear actuator 20b can include a housing 54 that extends from a first end 54a to a second end 54b opposite the first end 54a along the longitudinal direction 2. The housing 54 can be substantially hollow, such that the housing 54 defines a cavity 56 configured to contain the operational components of the second linear actuator 20b. For example, an actuation module 58 of the second linear actuator 20b can be disposed within the cavity 56 of the housing 54 at the first end 54a. The actuation module 58 can comprise any suitable type of linear actuation device, such as a planetary ball screw, non-planetary ball screw, hydraulic cylinder, pneumatic cylinder, rack and pinion, etc. A rod 62 can extend from the actuation module 58, such that the actuation module 58 is configured to linearly translate the rod 62 along the longitudinal direction 2. The rod 62 can extend along the longitudinal direction 2 from a first end 62a to a second end 62b opposite the first end 62a along the longitudinal direction 2. The rod 62 can be attached to the actuation module 58 at the first end 62a, whereas the second end 62b of the rod 62 can be operably attached to the metering rod 92. The second end 54b of the housing 54 can define a passage 66 extending therethrough, where the passage 66 can extend substantially along the longitudinal direction 2. A bearing 70 can be disposed within the passage 66, and the rod 62 can extend through the bearing 70. The bearing 70 can be configured to guide the rod 62 and enable linear movement of the rod 62 along the longitudinal direction 2.

Each of the first and second metering systems 15a, 15b, and specifically the linear actuators 20a, 20b of the first and second metering systems 15a, 15b, can be in wired and/or wireless communication with a controller 72. The controller 72 can be configured to control operation of the first and second linear actuators 20a, 20b, based on predetermined operations or input provided by an operator of the dispensing system 10. The controller 72 can comprise any suitable computing device configured to host a software application for monitoring and controlling various operations of the dispensing system 10 as described herein. It will be understood that the controller 72 can include any appropriate computing device, examples of which include a processor, a desktop computing device, a server computing device, or a portable computing device, such as a laptop, tablet, or smart phone. Specifically, the controller 72 can include a memory and a human-machine interface (HMI) device. The memory can be volatile (such as some types of RAM), non-volatile (such as ROM, flash memory, etc.), or a combination thereof. The controller 72 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 72. The memory of the controller 72 can be configured to store and recall on demand various metering operations to be performed by the first and second metering systems 15a, 15b.

The HMI device can include inputs that provide the ability to control the controller 72, via, for example, buttons, soft keys, a mouse, voice actuated controls, a touch screen, movement of the controller 72, visual cues (e.g., moving a hand in front of a camera on the controller 72), or the like. The HMI device can provide outputs via a graphical user interface, including visual information, such as the visual indication of the current conditions within the dispensing system 10, as well as acceptable ranges for these parameters via a display. Other outputs can include audio information (e.g., via speaker), mechanically (e.g., via a vibrating mechanism), or a combination thereof. In various configurations, the HMI device can include a display, a touch screen, a keyboard, a mouse, a motion detector, a speaker, a microphone, a camera, or any combination thereof. The HMI device can further include any suitable device for inputting biometric information, such as, for example, fingerprint information, retinal information, voice information, and/or facial characteristic information, for instance, so as to require specific biometric information for accessing the controller 72.

Continuing with FIGS. 1-3, the first metering system 15a includes a housing 80 attached to the housing 24. The housing 80, like the housing 24, can define a hollow interior space 80a. In the depicted embodiment, the housing 80 defines a solid body having a plurality of gaps extending therethrough, such that the components of the first metering system 15a located within the interior space 80a can be readily viewed. However, in some embodiments the housing 80 defines a substantially continuous body obscuring the components contained within the interior space 80a. Further, the dispensing system 10 can include a cover 75 attached to the exterior of the housing 80 so as to obscure the components contained within the interior space 80a, thus protecting these components from exterior forces or environmental contaminants. The cover 75 can be attached to the housing 80 via a plurality of fasteners 78. However, the cover 75 can be attached to the housing 80 through other means, such as snap-fit, interference fit, etc.

The first metering system 15a can include a metering rod 82 at least partially disposed within the housing 80. The metering rod 82 can have substantially elongate, cylindrical body that extends from a first end 82a to a second end 82b opposite the first end 82a along the longitudinal direction 2. In one example, the metering rod 82 can be coated with a hard, low friction plating such as Scoreguard by Nordson Corporation, although alternative examples of the disclosure are not so limited. In one example, the metering rod 82 can be formed from carbide, although the metering rod 82 can be formed from any suitable alternative material. The first end 82a of the metering rod 82 can be attached to the rod 32, such that the linear actuator 20a is configured to selectively linearly translate the metering rod 82 along the longitudinal direction 2. To attach the metering rod 82 to the rod 32, the first metering system 15a can include a coupling 84. The coupling 84 can define a substantially cylindrical, hollow shell, though other embodiments of the coupling 84 are contemplated. A fastener 86 can be at least partially disposed within the coupling 84, where the fastener 86 extends from the coupling 84 and engages the second end 32b of the rod 32. The fastener 86 can threadedly engage the second end 32b of the rod 32, though the fastener 86 can engage the rod 32 through other means as desired. At the opposite end, a pin 87 can extend through the coupling 84 along the vertical direction 6. The pin 87 can also extend through the first end 82a of the metering rod 82 so as to couple the metering rod 82 to the coupling 84, and thus the rod 32. Though depicted as extending along the vertical direction 6, the pin 87 can extend along any direction within a plane defined by the lateral and vertical directions 4, 6, or along any direction including a longitudinal component. To secure the pin 87 to the coupling 84 and the metering rod 82, a band 88 can be disposed around the coupling 84 and the opposing ends of the pin 87 after the pin 87 has connected the coupling 84 and metering rod 82. The band 88 can comprise a substantially flexible and elastic material, such as rubber, though other materials are contemplated. Though a specific structure has been described for coupling the metering rod 82 to the rod 32, other embodiments are contemplated. For example, the metering rod 82 and the rod 32 can be monolithic or integral with each other.

Like the first metering system 15a, the second metering system 15b includes a housing 90 attached to the housing 24. The housing 80, like the housing 54, can define a hollow interior space 90a. In the depicted embodiment, the housing 90 defines a solid body having a plurality of gaps extending therethrough, such that the components of the second metering system 15b located within the interior space 90a can be readily viewed. However, in some embodiments the housing 90 defines a substantially continuous body obscuring the components contained within the interior space 90a. Further, the cover 75 can be attached to the exterior of the housing 90 so as to obscure the components contained within the interior space 90a, thus protecting these components from exterior forces or environmental contaminants. The cover 75 can be attached to the housing 90 via a plurality of fasteners 78. However, the cover 75 can be attached to the housing 90 through other means, such as snap-fit, interference fit, etc.

The second metering system 15b can include a metering rod 92 at least partially disposed within the housing 90. The metering rod 92 can have substantially elongate, cylindrical body that extends from a first end 92a to a second end 92b opposite the first end 92a along the longitudinal direction 2. In one example, the metering rod 92 can be coated with a hard, low friction plating such as Scoreguard by Nordson Corporation, although alternative examples of the disclosure are not so limited. In one example, the metering rod 92 can be formed from carbide, although the metering rod 92 can be formed from any suitable alternative material. The first end 92a of the metering rod 92 can be attached to the rod 62, such that the second linear actuator 20b is configured to selectively linearly translate the metering rod 92 along the longitudinal direction 2. To attach the metering rod 92 to the rod 62, the second metering system 15b can include a coupling 94. The coupling 94 can define a substantially cylindrical, hollow shell, though other embodiments of the coupling 94 are contemplated. A fastener 96 can be at least partially disposed within the coupling 94, where the fastener 96 extends from the coupling 94 and engages the second end 62b of the rod 62. The fastener 96 can threadedly engage the second end 62b of the rod 62, though the fastener 96 can engage the rod 62 through other means as desired. At the opposite end, a pin 97 can extend through the coupling 94 along the vertical direction 6. The pin 97 can also extend through the first end 92a of the metering rod 92 so as to couple the metering rod 92 to the coupling 94, and thus the rod 62. Though depicted as extending along the vertical direction 6, the pin 97 can extend along any direction within a plane defined by the lateral and vertical directions 4, 6, or along any direction including a longitudinal component. To secure the pin 97 to the coupling 94 and the metering rod 92, a band 98 can be disposed around the coupling 94 and the longitudinal ends of the pin 97 after the pin 97 has connected the coupling 94 and metering rod 92. The band 98 can comprise a substantially flexible and elastic material, such as rubber, though other materials are contemplated. Though a specific structure has been described for coupling the metering rod 92 to the rod 62, other embodiments are contemplated. For example, the metering rod 92 and the rod 62 can be monolithic or integral with each other.

Figure 4:
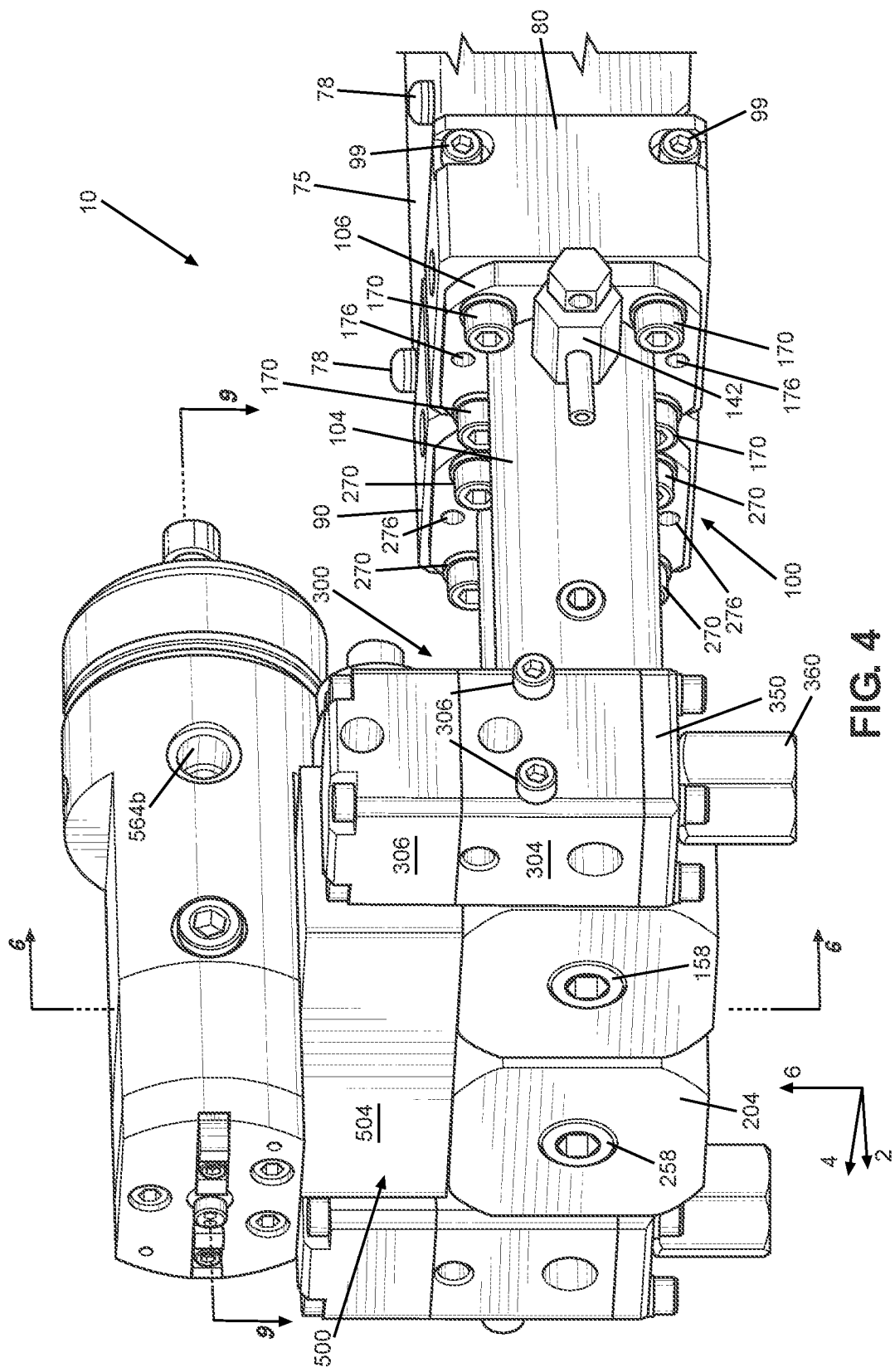
FIG. 4 illustrates an alternative perspective view of the dispensing system shown in FIG. 1.
Figure 5:
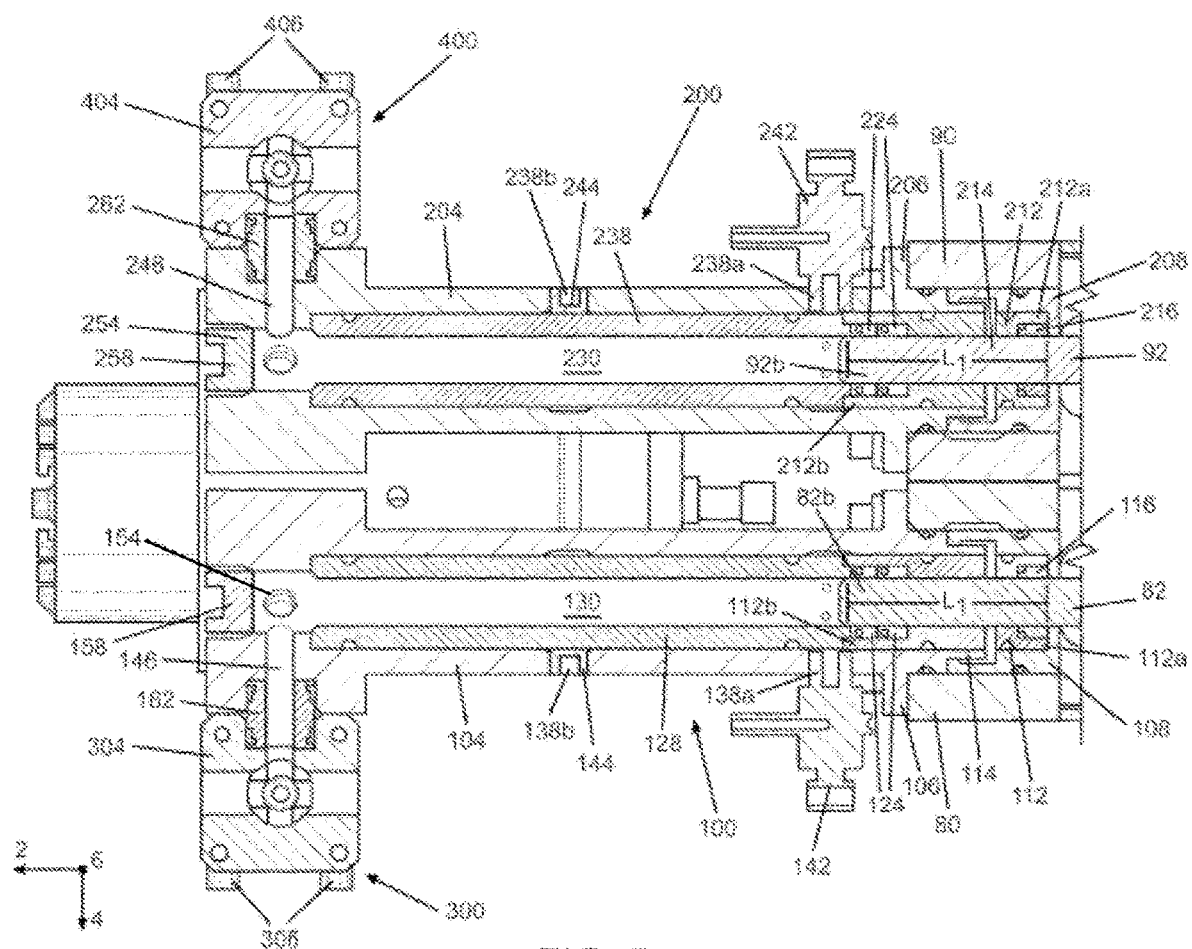
FIG. 5 illustrates an enlarged portion of the cross-sectional view of the dispensing system shown in FIG. 3.

Referring to FIGS. 4-5, the first metering system 15a can include an assembly 100 that defines the wetted components of the first metering system 15a, i.e., the components of the first metering system 15a that receive a flow of the first material. The assembly 100 can include a housing 104 and a cap 108 configured to be releasably coupled to the housing 104 so as to secure components disposed within the housing 104. The cap 108 can be engaged with the housing 104 through threaded attachment, though other means of attachment are contemplated, such as snap-fit, interference fit, etc. The housing 104 can define a flange 106 extending outwards from the housing 104, particularly at the end adjacent the housing 24. The flange 106 can be substantially square-shaped, though other shapes of the housing are contemplated. The flange 106 can define a plurality of bores 174 extending therethrough along the longitudinal direction 2. In operation, the flange 106 can be utilized to couple the assembly 100 to the housing 24. To couple the housing 104, and thus the assembly 100, to the housing 24, the flange 106 can be placed into contact with the housing 24 and a plurality of fasteners 170 can be disposed through at least some of the bores 174 of the flange 106 so as to releasably couple the housing 104 to the housing 24. Though it is contemplated that each of the bores 174 of the housing 104 can receive one of the fasteners 170, it is contemplated that not all of the bores 174 can receive a fastener 170, for reasons that will be discussed further below. Further, though a flange 106, bores 174, and a plurality of fasteners 170 are described as the devices utilized to couple the housing 104 to the housing 24, it is contemplated that other devices can be utilized to couple the housing 104 to the housing 24 in other embodiments.

The housing 104 can define a metering chamber 130 extending along the longitudinal direction 2, where the metering chamber 130 defines the area of the assembly 100 where the discrete amount of the first material will be received prior to being dispensed. The housing 104 can further define an inlet passage 146 configured to provide the first material to the metering chamber 130, as well as an outlet passage 150 configured to receive the first material from the metering chamber 130. Specifically, the inlet passage 146 can receive the first material from an input valve 300, and the outlet passage 150 can receive the first material from the metering chamber 130 and provide the first material to an output manifold 500, as will be described further below. The housing 104 can also define a flush passage 154 extending from the metering chamber 130 to the exterior of the housing 104, thus providing an operator access to the metering chamber 130, inlet passage 146, and outlet passage 150 during a cleaning operation. During normal dispensing operations, a plug 158 can be disposed within the flush passage 154 to prevent the first material from escaping the assembly 100. To perform a cleaning operation, an operator can unscrew or otherwise remove the plug 158 from the flush passage 154, either by hand or through use of a tool.

The metering chamber 130 can be specifically defined by a sleeve 128 received within the housing 104. The sleeve 128 can define a substantially elongate, hollow body extending along the longitudinal direction 2, though other embodiments are contemplated. The assembly 100 can also include a seal retainer 112 received within the housing 104 and positioned between the sleeve 128 and the cap 108. The seal retainer 112 can extend from a first end 112a to a second end 112b opposite the first end 112a along the longitudinal direction 2. In particular, the seal retainer 112 can be in direct contact with the cap 108 at the first end 112a and the sleeve 128 the second end 112b. As a result, the cap 108 and sleeve 128 can prevent the seal retainer 112 from moving within the housing 104 once the cap 108 has been securely attached to the housing 104. When disposed within the housing 104, the metering chamber 130 can extend from the seal retainer 112 to the outlet passage 150.

The seal retainer 112 can define a central passage 114 configured to allow the metering rod 82 to extend therethrough, such that the metering rod 82 can extend through the housing 24, through the seal retainer 112, and into the metering chamber 130. The central passage 114 can be sized such that the metering rod 82 is permitted to freely move linearly through the seal retainer 112 along the longitudinal direction 2. At the first end 112a, the seal retainer 112 can be configured to receive a seal 116 that extends around the metering rod 82 so as to create a fluid seal with the metering rod 82. The seal 116 can prevent air from the housing 24 from entering the metering chamber 130 through and/or around the seal retainer 112. At the opposite end, the second end 112b of the seal retainer 112 can be configured to receive two seals 124 that, like the seal 116, extend around the metering rod 82 so as to create a fluid seal with the metering rod 82. The seals 124 can prevent the first material from exiting the metering chamber 130 through the central passage 114 of the seal retainer 112 or around the seal retainer 112. Though shown as receiving a single seal 116 at the first end 112a and two seals 124 at the second end 112b, each of the first and second ends 112a, 112b of the seal retainer 112 can receive more or less seals than shown. In the depicted embodiment, the seal retainer 112 can define a first length $L_1$ measured along the longitudinal direction 2. The length of the seal retainer 112 can be instrumental in dictating the size of the metering chamber 130, as will be discussed further below.

The housing 104 can including at least one bore extending through its body from the metering chamber 130. In the depicted embodiment, the housing 104 defines a rearward bore 138a and a forward bore 138b positioned between the rearward bore 138a and the outlet passage 150 along the longitudinal direction 2. One of the forward and rearward bores 138a, 138b can receive a bleed valve 142, while the other can receive a plug 144. In the depicted embodiment, the rearward bore 138a receives the bleed valve 142, while the forward bore 138b receives the plug 144, though the opposite can be true in other embodiments. The plug 144 is configured to seal the forward bore 138b so as to prevent the first material from escaping the housing 104. The bleed valve 142, which can be positioned adjacent the second end 112b of the seal retainer 112, can be configured to allow the first material to escape the housing 104 in the event of a component failure, such as leaking of one of the seals 124.

Continuing with FIGS. 4-5, the second metering system 15b can include an assembly 200 that defines the wetted components of the second metering system 15b, i.e., the components of the second metering system 15b that receive a flow of the second material. Though described as being substantially similar to the assembly 100, the assembly 200 can have various differences in operation. The assembly 200 can include a housing 204 and a cap 208 configured to be releasably coupled to the housing 204 so as to secure components disposed within the housing 204. The cap 208 can be engaged with the housing 204 through threaded attachment, though other means of attachment are contemplated, such as snap-fit, interference fit, etc. The housing 204 can define a flange 206 extending outwards from the housing 204, particularly at the end adjacent the housing 54. The flange 206 can be substantially square-shaped, though other shapes of the housing are contemplated. The flange 206 can define a plurality of bores 274 extending therethrough along the longitudinal direction 2. In operation, the flange 206 can be utilized to couple the assembly 200 to the housing 54. To couple the housing 204, and thus the assembly 200, to the housing 54, the flange 206 can be placed into contact with the housing 54 and a plurality of fasteners 270 can be disposed through at least some of the bores 274 of the flange 206 so as to couple the housing 204 to the housing 54. Though it is contemplated that each of the bores 274 of the housing 204 can receive one of the fasteners 270, it is contemplated that not all of the bores 274 can receive a fastener 270, for reasons that will be discussed further below. Further, though a flange 206, bores 274, and a plurality of fasteners 270 are described as the devices utilized to releasably couple the housing 204 to the housing 54, it is contemplated that other devices can be utilized to couple the housing 204 to the housing 54 in other embodiments.

The housing 204 can define a metering chamber 230 extending along the longitudinal direction 2, where the metering chamber 230 defines the area of the assembly 200 where the discrete amount of the second material will be received prior to being dispensed. The housing 204 can further define an inlet passage 246 configured to provide the second material to the metering chamber 230, as well as an outlet passage 250 configured to receive the second material from the metering chamber 230. Specifically, the inlet passage 246 can receive the second material from an input valve 400, and the outlet passage 250 can receive the second material from the metering chamber 230 and provide the second material to the output manifold 500, as will be described further below. The housing 204 can also define a flush passage 254 extending from the metering chamber 230 to the exterior of the housing 204, thus providing an operator access to the metering chamber 230, inlet passage 246, and outlet passage 250 during a cleaning operation. During normal dispensing operations, a plug 258 can be disposed within the flush passage 254 to prevent the second material from escaping the assembly 200. To perform a cleaning operation, an operator can unscrew or otherwise remove the plug 258 from the flush passage 254, either by hand or through use of a tool.

The metering chamber 230 can be specifically defined by a sleeve 228 received within the housing 204. The sleeve 228 can define a substantially elongate, hollow body extending along the longitudinal direction 2, though other embodiments are contemplated. The assembly 200 can also include a seal retainer 212 received within the housing 204 and positioned between the sleeve 228 and the cap 208. The seal retainer 212 can extend from a first end 212a to a second end 212b opposite the first end 212a along the longitudinal direction 2. In particular, the seal retainer 212 can be in direct contact with the cap 208 at the first end 212a and the sleeve 228 at the second end 212b. As a result, the cap 208 and sleeve 228 can prevent the seal retainer 212 from moving within the housing 204 once the cap 208 has been securely attached to the housing 204. When disposed within the housing 204, the metering chamber 230 can extend from the seal retainer 212 to the outlet passage 250.

The seal retainer 212 can define a central passage 214 configured to allow the metering rod 92 to extend therethrough, such that the metering rod 92 can extend through the housing 54, through the seal retainer 212, and into the metering chamber 230. The central passage 214 can be sized such that the metering rod 92 is permitted to freely move linearly through the seal retainer 212 along the longitudinal direction 2. At the first end 212a, the seal retainer 212 can be configured to receive a seal 216 that extends around the metering rod 92 so as to create a fluid seal with the metering rod 92. The seal 216 can prevent air from the housing 54 from entering the metering chamber 230 through and/or around the seal retainer 212. At the opposite end, the second end 212b of the seal retainer 212 can be configured to receive two seals 224 that, like the seal 216, extend around the metering rod 92 so as to create a fluid seal with the metering rod 92. The seals 224 can prevent the second material from exiting the metering chamber 230 through the central passage 214 of the seal retainer 212 or around the seal retainer 212. Though shown as receiving a single seal 216 at the first end 212a and two seals 224 at the second end 212b, each of the first and second ends 212a, 212b of the seal retainer 212 can receive more or less seals than shown. In the depicted embodiment, the seal retainer 212 can define a first length $L_1$ measured along the longitudinal direction 2. As depicted, both the first and second seal retainers 112, 212 can define the first length $L_1$, and as such the first and second metering chambers 130, 230 can be equally sized. However, in operation the first and second metering chambers 130, 230 can be differently sized, as will be described further below.

The housing 204 can including at least one bore extending through its body from the metering chamber 230. In the depicted embodiment, the housing 204 defines a rearward bore 238a and a forward bore 238b positioned between the rearward bore 248a and the outlet passage 250 along the longitudinal direction 2. One of the forward and rearward bores 248a, 248b can receive a bleed valve 242, while the other can receive a plug 244. In the depicted embodiment, the rearward bore 238a receives the bleed valve 242, while the forward bore 248b receives the plug 244, though the opposite can be true in other embodiments. The plug 244 is configured to seal the forward bore 238b so as to prevent the second material from escaping the housing 204. The bleed valve 242, which can be positioned adjacent the second end 212b of the seal retainer 212, can be configured to allow the second material to escape the housing 204 in the event of a component failure, such as leaking of one of the seals 224.

Figure 6:
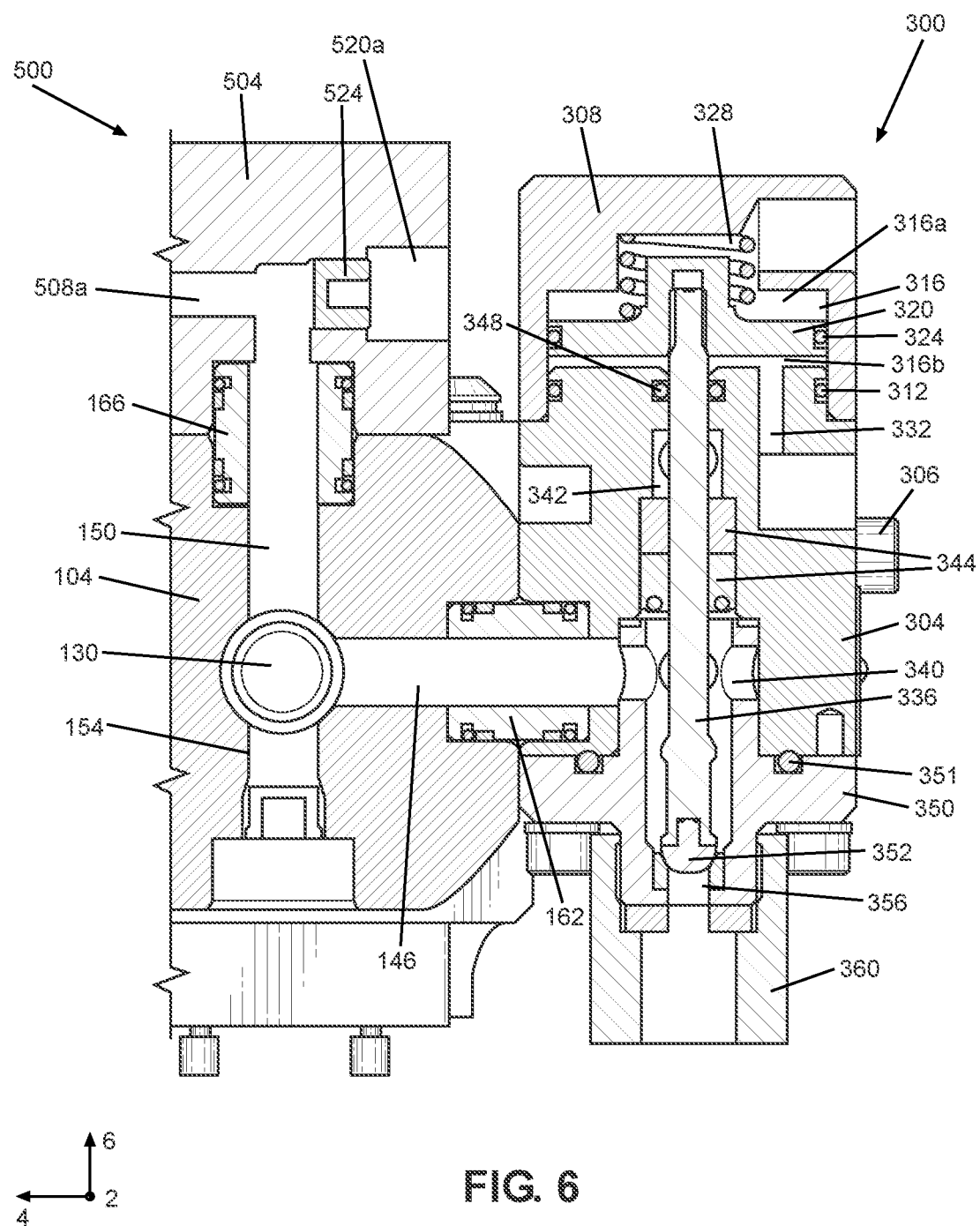
FIG. 6 illustrates a portion of a cross-sectional view of the dispensing system shown in FIG. 1, taken along line 6-6 shown in FIG. 4.

Continuing with FIG. 6, the input valve 300 will be described in greater detail. The input valve 300 can be releasably attached to the housing 104, such as through a plurality of fasteners 306, and configured to selectively provide the first material to the inlet passage 146. However, other methods of releasably attaching the input valve 300 to the housing 104 are contemplated. Further, it is also contemplated that in other embodiments the input valve 300 can be integral with the housing 104. The input valve 300 can comprise a body 304 and a cap 308 attached to an upper end of the body 304. The cap 308 can be engaged with the body 304 through threaded attachment, though other means of attachment are contemplated, such as snap-fit, interference fit, etc. The body 304 and the cap 308 can define an actuation chamber 316 therebetween, where the actuation chamber 316 is configured to receive a piston 320. The piston 320 can divide the actuation chamber 316 into an upper portion 316a above the piston 320 and between the piston 320 and the cap 308, as well as a lower portion 316b below the piston 320 and between the piston 320 and the body 304. A needle 336 can be attached to the piston 320 and extend through the lower portion 316b of the actuation chamber 316 and through the body 304 of the input valve 300, as will be discussed further below. A seal 324 can be disposed around the piston 320 between the piston 320 and the body 304 so as to prevent air from leaking between the upper and lower portions 316a, 316b of the actuation chamber 316.

The piston 320 can be configured to translate within the actuation chamber 316 along the vertical direction 6. Translation of the piston 320 likewise causes upward and downward translation of the needle 336 along the vertical direction 6. To move the piston 320, and thus the needle 336 upwards, pressurized air can be provided to the lower portion 316b of the actuation chamber 316 through an air input 332 in fluid communication with the actuation chamber 316. Specifically, the air input 332 can extend through the body 304 from the actuation chamber 316 to the outer surface of the body 304, where the air input 332 can be connected to and receive pressurized air from a pressurized air source (not shown). The input valve 300 can include a seal 312, such as an elastomeric O-ring, that is disposed between the body 304 and the cap 308, so as to prevent pressurized air from leaking out of the lower portion 316b of the actuation chamber 316. To move the piston 320, and thus the needle 336 downwards, the input valve 300 can include a spring 328 disposed in the upper portion 316a of the actuation chamber 316. The spring 328 can be biased between the upper surface of the piston 320 and the inner surface of the cap 308, such that the spring 328 is in a constant state of compression and constantly exerting a downward force on the piston 320. To move the piston 320 upwards, pressurized air must be provided to the lower portion 316b of the actuation chamber 316 to an extent that overcomes the downward force applied to the piston 320 by the spring 328. However, when no pressurized air is provided to the lower portion 316b of the actuation chamber 316 or pressurized air is provided at an insufficient pressure, the spring 328 will force the piston 320 and needle 336 downwards. The cap 308 can function to limit the upward movement of the piston 320, while the body 304 can function to limit the downward movement of the piston 320. Though upward movement of the piston 320 in the depicted embodiment occurs due to pressurized air and downward movement occurs due to force applied by the spring 328, in other embodiments upward force can be applied by a spring and downward force applied by pressurized air, or both upward and downward forces can be applied to the piston by pressurized air.

Opposite the actuation chamber 316, the body 304 of the input valve 300 can define a material chamber 340. A passage 342 can extend from the actuation chamber 316 to the material chamber 340, where the needle 336 is configured to extend from the piston 320, through the lower portion 316b of the actuation chamber 316, through the passage 342, and into the material chamber 340. A seal 348 can be disposed around the needle 336 at the upper end of the passage 342, where the seal 348 creates a fluid seal between the needle 336 and the body 304 while still allowing relative movement between the needle 336 and the seal 348. The seal 348 can prevent pressurized air from leaking out of the lower portion 316b of the actuation chamber 316 and into the passage 342. Two seals 344 can be positioned within the lower end of the passage 342 and around the needle 336 so as to create a fluid seal around the needle 336 to prevent the first material from leaking from the material chamber 340 through the passage 342, while still allowing relative movement between the seals 344 and the needle 336.

The material chamber 340 can define the portion of the input valve 300 configured to receive the first material from a first material source (not shown). The material chamber 340 can be defined by the body 304 of the input valve 300 and a nozzle cap 350 attached to the lower end of the body 304. The nozzle cap 350 can be engaged with the body 304 through threaded attachment, though other means of attachment are contemplated, such as snap-fit, interference fit, etc. A seal 351 can be positioned between the nozzle cap 350 and the body 304 so as to prevent material from leaking out of the material chamber 340 between the nozzle cap 350 and the body 304. A connector 360 can be attached to the nozzle cap 350, where the connector 360 is configured to provide an interface between the nozzle cap 350 and a hose or other conveying means extending from the first material source to the nozzle cap 350. The assembly 100 can further include a connector 162 configured to connect to both the housing 104 and the body 304 of the input valve 300. The connector 162 can provide a fluid connection between the inlet passage 146 of the housing 104 and the material chamber 340 of the input valve 300, as well as provide a fluid seal between the housing 104 and the input valve 300 to prevent the first material from leaking out of the assembly 100 as it flows from the input valve 300 to the housing 104. As such, the first material enters the first metering system 15a through the connector 360, and enters the housing 104 through the material chamber 340, through the connector 162, and into the inlet passage 146. In one example, the connector 162 can be configured to selectively connect the input valve 300 to the housing 104 at different rotational angles about an axis that extends through the connector 162 along the lateral direction 4. For example, the input valve 300 could be connected to the housing 104 at an angle that is rotated 90 degrees, 180 degrees, or 270 degrees about the axis relative to the position shown.

To control the flow of the first material into the first metering system 15a, the input valve 300 can include a valve seat 356, and the needle 336 can include a valve member 352. Though one embodiment of the valve seat 356 and valve member 352 is shown, the valve seat 356 and valve member 352 can have various embodiments where contact between the valve seat 356 and the valve member 352 prevents the first material from flowing into the material chamber 340 from the connector 360. In operation, the first needle 336 is configured to translate between a first position and a second position. To move the needle 336 into the first position, no pressurized air is provided to the lower portion 316b of the actuation chamber 316, which causes the spring 328 to force the piston 320 downwards within the actuation chamber 316. As a result, the needle 336 is forced downwards until the valve member 352 contacts the valve seat 356. As such, in the first position, the first material is prevented from flowing from the connector 360 into the material chamber 340, and ultimately to the metering chamber 130. To move the needle 336 into the second position, pressurized air is provided to the lower portion 316b of the actuation chamber 316 to an extent so as to overcome the downward force exerted on the piston 320 by the spring 328, which forces the piston 320 upwards within the actuation chamber 316. As a result, the needle 336 is forced upwards until the piston 320 contacts the cap 308, and the valve member 352 is spaced from the valve seat 356. As such, in the second position, the first material is permitted to flow from the connector 360 into the material chamber 340, and ultimately the metering chamber 130.

Figure 7:
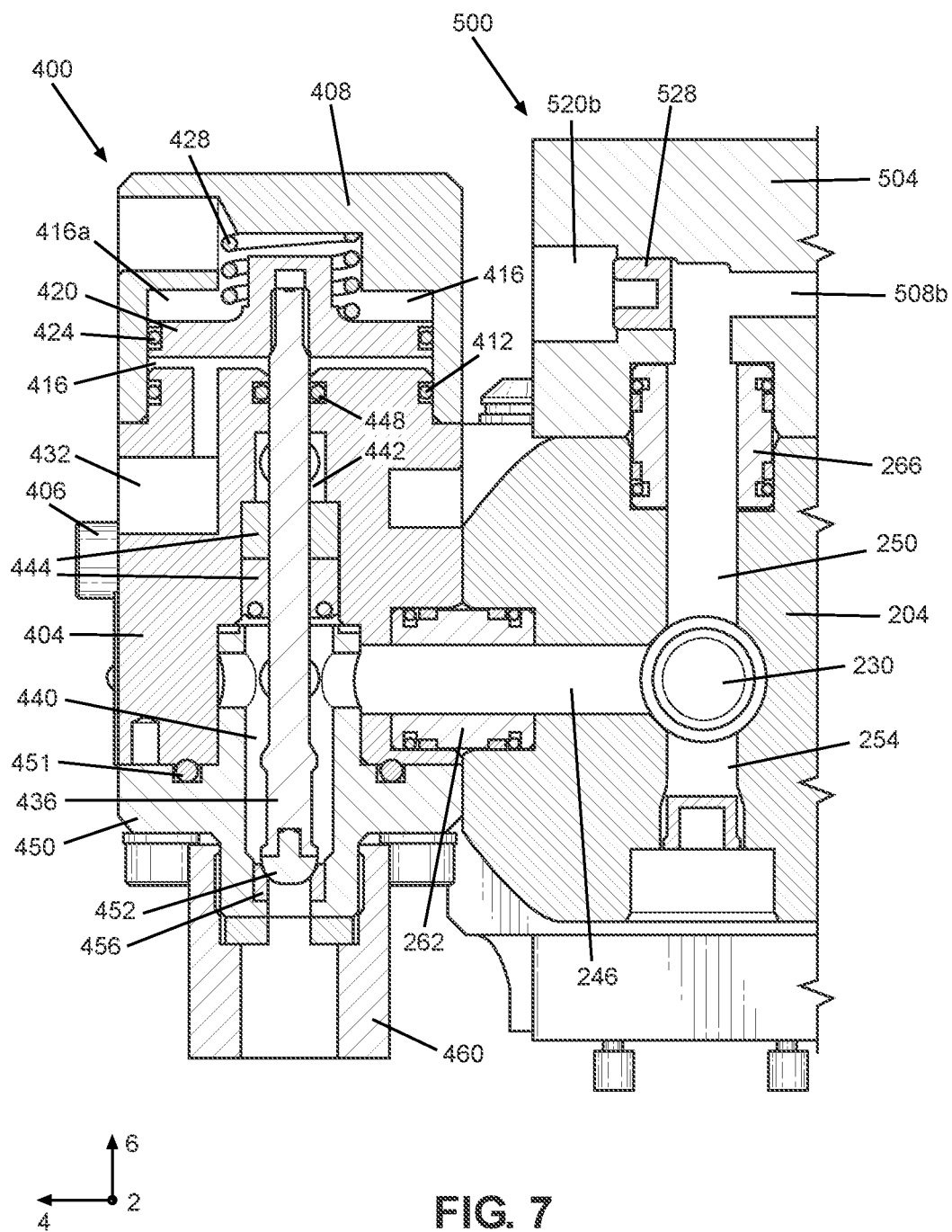
FIG. 7 illustrates another portion of the cross-sectional view of the dispensing system shown in FIG. 1, taken along line 6-6 shown in FIG. 4.

Continuing with FIG. 7, the input valve 400 will be described in greater detail. Though the input valve 400 will be described as being very similar to the input valve 300, in operation the input valves 300, 400 can differ as desired. The input valve 400 can be releasably attached to the housing 204, such as through a plurality of fasteners 406, and configured to selectively provide the second material to the inlet passage 246. However, other methods of releasably attaching the input valve 400 to the housing 204 are contemplated. Further, it is also contemplated that in other embodiments the input valve 400 can be integral with the housing 204. The input valve 400 can comprise a body 404 and a cap 408 attached to an upper end of the body 404. The cap 408 can be engaged with the body 404 through threaded attachment, though other means of attachment are contemplated, such as snap-fit, interference fit, etc. The body 404 and the cap 408 can define an actuation chamber 416 therebetween, where the actuation chamber 416 is configured to receive a piston 420. The piston 420 can divide the actuation chamber 416 into an upper portion 416a above the piston 420 and between the piston 420 and the cap 408, as well as a lower portion 416b below the piston 420 and between the piston 420 and the body 404. A needle 436 can be attached to the piston 420 and extend through the lower portion 416b of the actuation chamber 416 and through the body 404 of the input valve 400, as will be discussed further below. A seal 424 can be disposed around the piston 420 between the piston 420 and the body 404 so as to prevent air from leaking between the upper and lower portions 416a, 416b of the actuation chamber 416.

The piston 420 can be configured to translate within the actuation chamber 416 along the vertical direction 6. Translation of the piston 420 likewise causes upward and downward translation of the needle 436 along the vertical direction 6. To move the piston 420, and thus the needle 436 upwards, pressurized air can be provided to the lower portion 416b of the actuation chamber 416 through an air input 432 in fluid communication with the actuation chamber 416. Specifically, the air input 432 can extend through the body 404 from the actuation chamber 416 to the outer surface of the body 404, where the air input 432 can be connected to and receive pressurized air from a pressurized air source (not shown). The input valve 400 can include a seal 412, such as an elastomeric O-ring, that is disposed between the body 404 and the cap 408, so as to prevent pressurized air from leaking out of the lower portion 416b of the actuation chamber 416. To move the piston 420, and thus the needle 436 downwards, the input valve 400 can include a spring 428 disposed in the upper portion 416a of the actuation chamber 416. The spring 428 can be biased between the upper surface of the piston 420 and the inner surface of the cap 408, such that the spring 428 is in a constant state of compression and constantly exerting a downward force on the piston 420. To move the piston 420 upwards, pressurized air must be provided to the lower portion 416b of the actuation chamber 416 to an extent that overcomes the downward force applied to the piston 420 by the spring 428. However, when no pressurized air is provided to the lower portion 416b of the actuation chamber 416 or pressurized air is provided at an insufficient pressure, the spring 428 will force the piston 420 and needle 436 downwards. The cap 408 can function to limit the upward movement of the piston 420, while the body 404 can function to limit the downward movement of the piston 420. Though upward movement of the piston 420 in the depicted embodiment occurs due to pressurized air and downward movement occurs due to force applied by the spring 428, in other embodiments upward force can be applied by a spring and downward force applied by pressurized air, or both upward and downward forces can be applied to the piston by pressurized air.

Opposite the actuation chamber 416, the body 404 of the input valve 400 can define a material chamber 440. A passage 442 can extend from the actuation chamber 416 to the material chamber 440, where the needle 436 is configured to extend from the piston 420, through the lower portion 416b of the actuation chamber 316, through the passage 442, and into the material chamber 440. A seal 448 can be disposed around the needle 436 at the upper end of the passage 442, where the seal 448 creates a fluid seal between the needle 436 and the body 404 while still allowing relative movement between the needle 436 and the seal 448. The seal 448 can prevent pressurized air from leaking out of the lower portion 416b of the actuation chamber 416 and into the passage 442. Two seals 444 can be positioned within the lower end of the passage 442 and around the needle 436 so as create a fluid seal around the needle 436 to prevent the second material from leaking from the material chamber 440 through the passage 442, while still allowing relative movement between the seals 444 and the needle 436.

The material chamber 440 can define the portion of the input valve 400 configured to receive the second material from a second material source (not shown). The material chamber 440 can be defined by the body 404 of the input valve 400 and a nozzle cap 450 attached to the lower end of the body 404. The nozzle cap 450 can be engaged with the body 404 through threaded attachment, though other means of attachment are contemplated, such as snap-fit, interference fit, etc. A seal 451 can be positioned between the nozzle cap 450 and the body 404 so as to prevent material from leaking out of the material chamber 440 between the nozzle cap 450 and the body 404. A connector 460 can be attached to the nozzle cap 450, where the nozzle cap 450 is configured to provide an interface between the nozzle cap 450 and a hose or other conveying means extending from the second material source to the nozzle cap 450. The assembly 200 can further include a connector 262 configured to connect to both the housing 204 and the body 404 of the input valve 400. The connector 262 can provide a fluid connection between the inlet passage 246 of the housing 104 and the material chamber 440 of the input valve 400, as well as provide a fluid seal between the housing 204 and the input valve 400 to prevent the second material from leaking out of the assembly 200 as it flows from the input valve 400 to the housing 204. As such, the second material enters the second metering system 15b through the connector 460, and enters the housing 204 through the material chamber 440, through the connector 262, and into the inlet passage 246. In one example, the connector 262 can be configured to selectively connect the input valve 400 to the housing 104 at different rotational angles about an axis that extends through the connector 262 along the lateral direction 4. For example, the input valve 400 could be connected to the housing 104 at an angle that is rotated 90 degrees, 180 degrees, or 270 degrees about the axis relative to the position shown.

To control the flow of the second material into the second metering system 15b, the input valve 400 can include a valve seat 456, and the needle 436 can include a valve member 452. Though one embodiment of the valve seat 456 and valve member 452 is shown, the valve seat 456 and valve member 452 can have various embodiments where contact between the valve seat 456 and the valve member 452 prevents the second material from flowing into the material chamber 440 from the connector 460. In operation, the first needle 436 is configured to translate between a first position and a second position. To move the needle 436 into the first position, no pressurized air is provided to the lower portion 416b of the actuation chamber 416, which causes the spring 428 to force the piston 420 downwards within the actuation chamber 416. As a result, the needle 436 is forced downwards until the valve member 452 contacts the valve seat 456. As such, in the first position, the second material is prevented from flowing from the connector 460 into the material chamber 440, and ultimately to the metering chamber 230. To move the needle 436 into the second position, pressurized air is provided to the lower portion 416b of the actuation chamber 416, pressurized air is provided to the lower portion 416b of the actuation chamber 416 to an extent so as to overcome the downward force exerted on the piston 420 by the spring 428, which forces the piston 420 upwards within the actuation chamber 416. As a result, the needle 436 is forced upwards until the piston 420 contacts the cap 408, and the valve member 452 is spaced from the valve seat 456. As such, in the second position, the second material is permitted to flow from the connector 460 into the material chamber 440, and ultimately the metering chamber 230.

Figure 8:
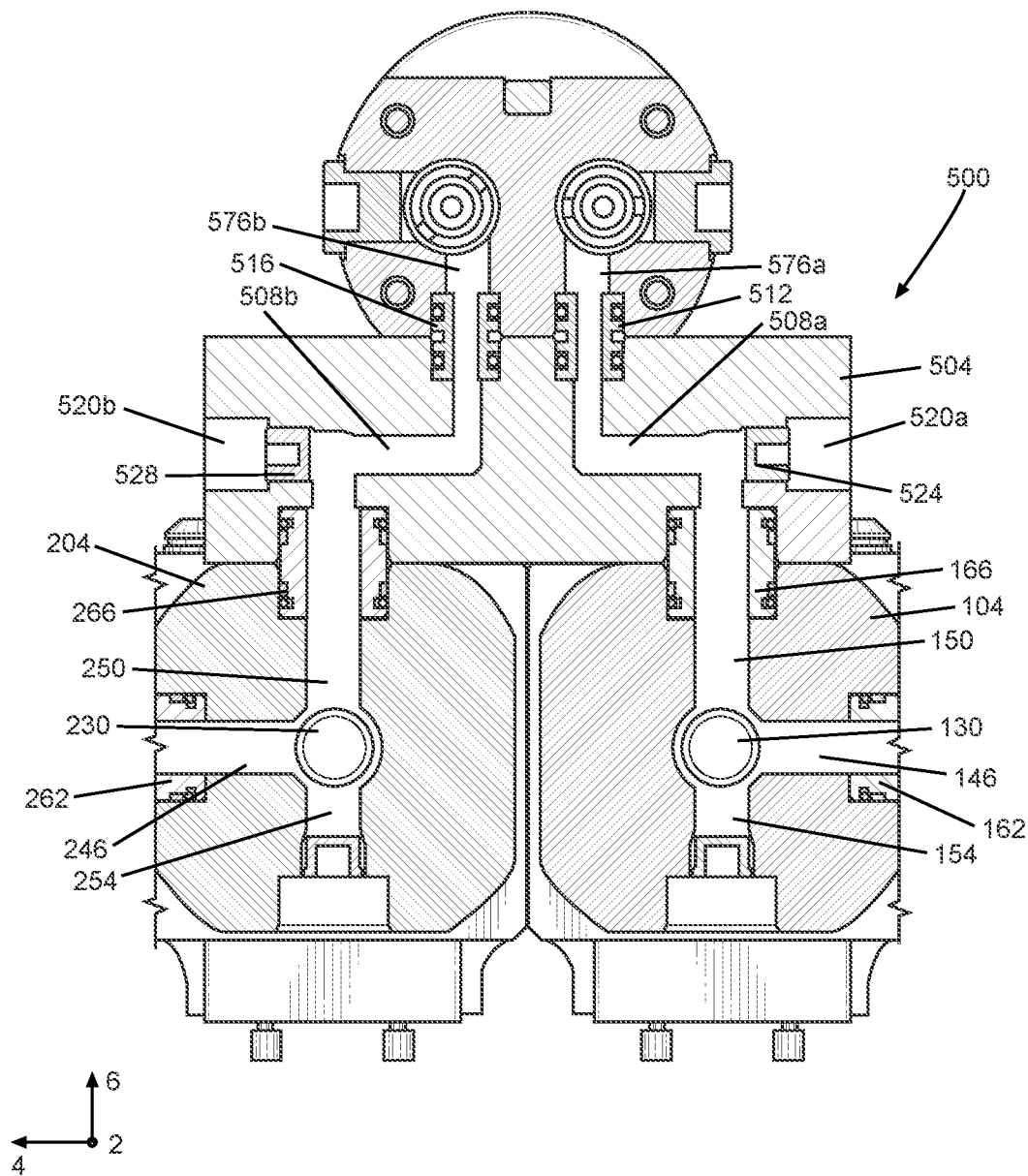
FIG. 8 illustrates a further portion of the cross-sectional view of the dispensing system shown in FIG. 1, taken along line 6-6 shown in FIG. 4.

Now referring to FIG. 8, each of the first and second metering systems 15a, 15b, and particularly the housings 104, 204 of the assemblies 100, 200 of the first and second metering systems 15a, 15b, can be releasably attached to an output manifold 500. The output manifold 500 can include a body 504, as well as first and second passage 508a, 508b that extend through the body. The first passage 508a can be configured to receive the first material from the outlet passage 150 of housing 104 through a connector 166, while the second passage 508b can be configured to receive the second material from the outlet passage 250 of the housing 204 through a connector 266. The connectors 166, 266 can be configured to provide an interface between the housings 104, 204 and the output manifold 500, as well as create a fluid seal between the housings 104, 204 and the output manifold 500. The first and second passages 508a, 508b can be configured to redirect the flows of the first and second materials such that the flows are aligned with the input channels 576a, 576b of an output valve 540, which will be discussed further below. The output manifold 500 can further include a first flush port 520a in fluid communication with the first passage 508a, where the first flush port 520a is configured to provide access to first passage 508a during a cleaning operation. During normal operation, a plug 524 can be received within the first flush port 520a so as to create a fluid seal within the first flush port 520a and prevent the first material from leaking out of the first passage 508a. Likewise, the output manifold 500 can include a second flush port 520b in fluid communication with the second passage 508b, where the second flush port 520b is configured to provide access to the second passage 508b during a cleaning operation. During normal operation, a plug 528 can be received within the second flush port 520b so as to create a fluid seal within the second flush port 520b and prevent the second material from leaking out of the second passage 508b.

As shown in FIG. 2, the dispensing system 10 can include first and second pressure sensors 532, 536 attached to the output manifold 500. The first pressure sensor 532 can be in fluid communication with the first passage 508a such that the first pressure sensor 532 can be configured to detect a pressure of the first material flowing through the first passage 508a. Likewise, the second pressure sensor 536 can be in fluid communication with the second passage 508b such that the second pressure sensor 536 can be configured to detect a pressure of the second material flowing through the second passage 508b. Each of the first and second pressure sensors 532, 536 can be in wired and/or wireless communication with the controller 72, and can each be configured to individually transmit a signal to the controller 72 that is indicative of the pressure of the first and second materials flowing within the respective first and second passages 508a, 508b. The controller 72 can, via an HMI device, display these pressure values so that an operator of the dispensing system 10 can remain apprised of flow characteristics within the dispensing system 10 and adjust operational parameters of the dispensing system 10 accordingly.

Figure 9A:
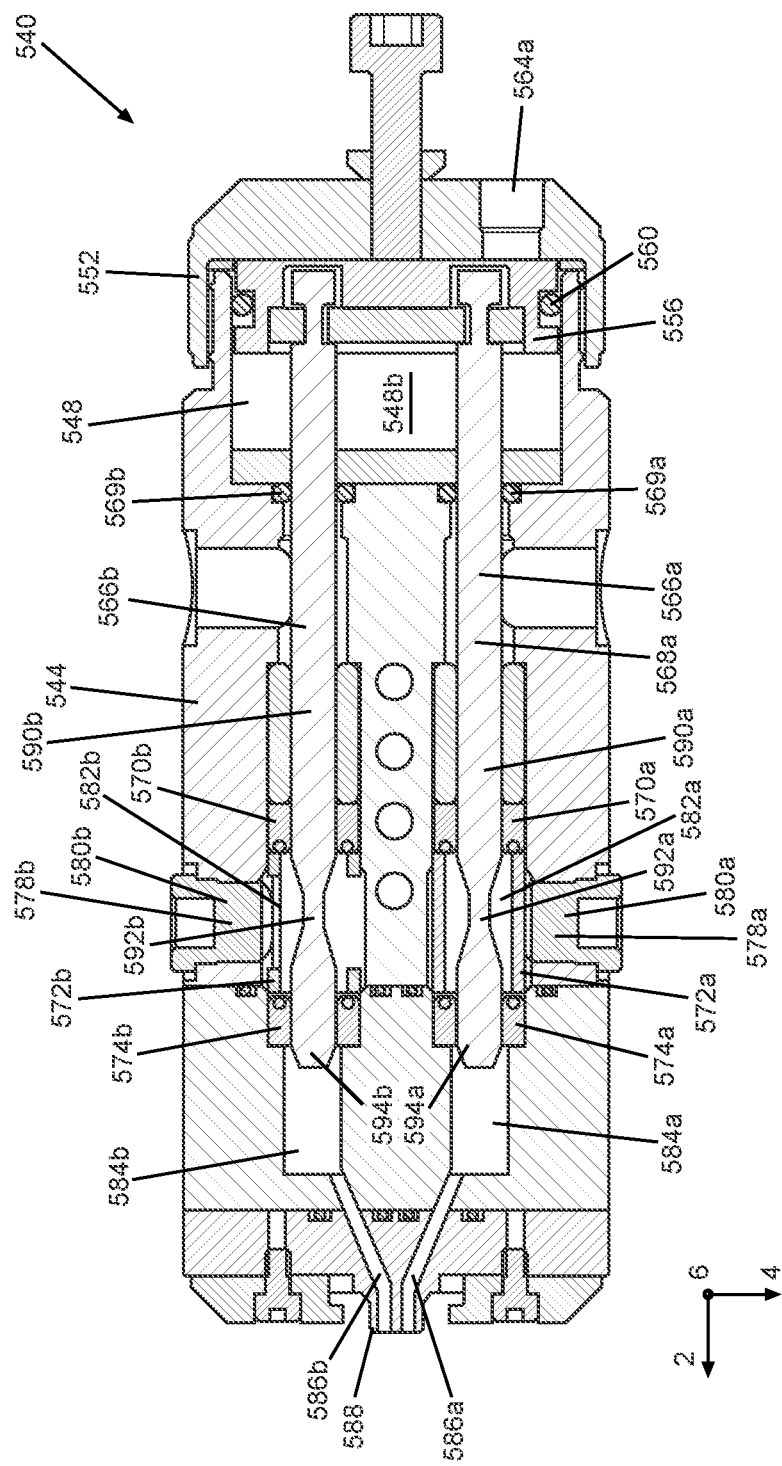
FIG. 9A illustrates a cross-sectional view of the dispensing system shown in FIG. 1, taken along line 9-9 shown in FIG. 4, with the first and second needles in a first position.
Figure 9B:
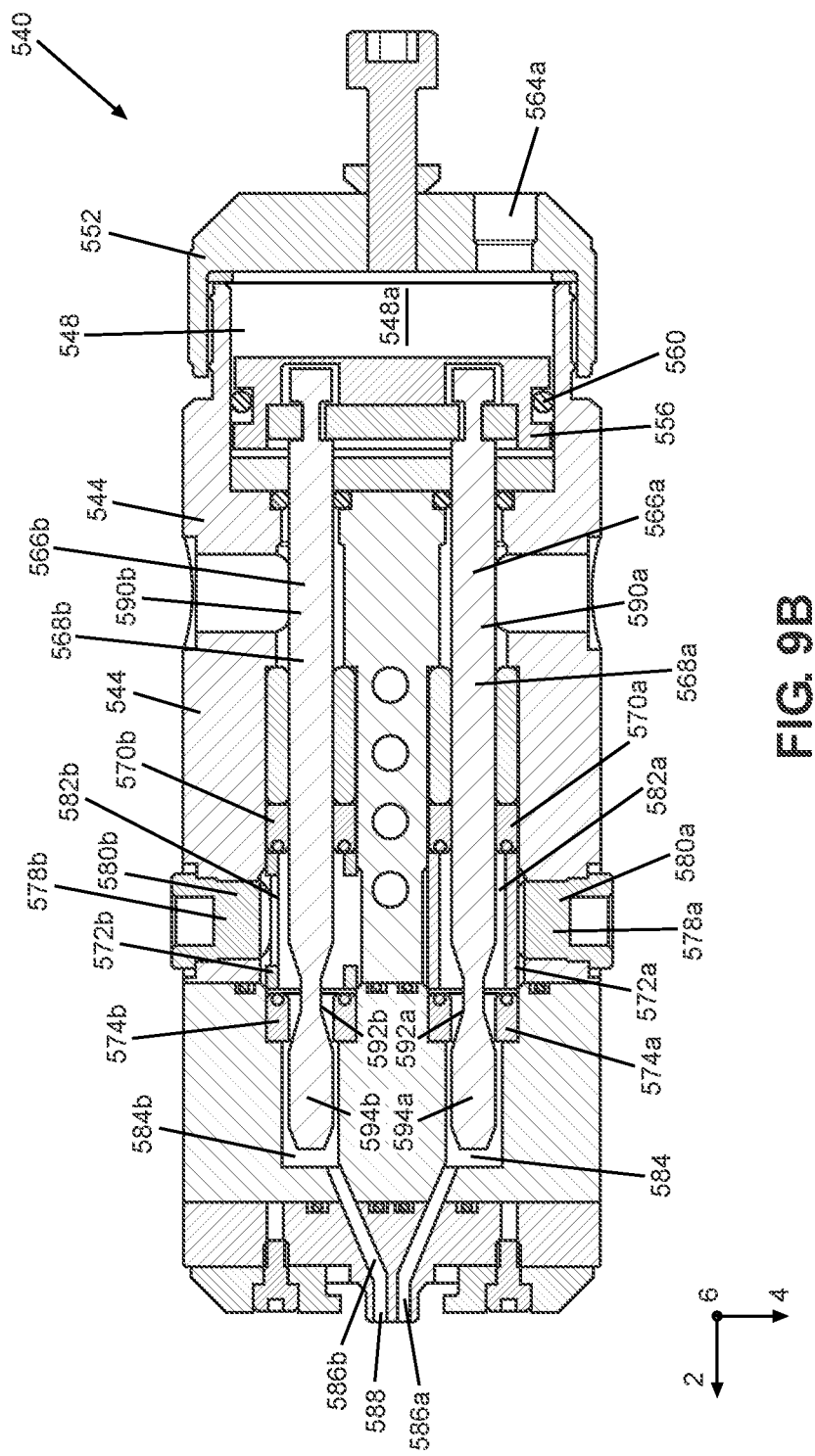
FIG. 9B illustrates a cross-sectional view of the dispensing system shown in FIG. 1, taken along line 9-9 shown in FIG. 4, with the first and second needles in a second position.

Now referring to FIGS. 8-9B, the dispensing system 10 can further include an output valve 540 connected to the output manifold 500. In the depicted embodiment, the output valve 540 is releasably connected to the output manifold 500, though in other embodiments the output valve 540 and the output manifold 500 can be integral with each other. The output valve 540 can be configured to receive the first and second materials from the output manifold 500 and selectively provide the first and second materials to a static mixer (not shown), as will be described further below. The output valve 540 can include a body 544 and a cap 552 attached to a rearward end of the body 544. The cap 552 can be engaged with the body 544 through threaded attachment, though other means of attachment are contemplated, such as snap-fit, interference fit, etc. The body 544 and the cap 552 can define an actuation chamber 548 therebetween, where the actuation chamber 548 is configured to receive a piston 556. The piston 556 can divide the actuation chamber 548 into a first portion 548a rearward of the piston 556 and between the piston 556 and the cap 552, as well as a second portion 548b forward of the piston 556 and between the piston 556 and the body 544. A first needle 566a and a second needle 566b can be attached to the piston 556 and extend through the second portion 548b of the actuation chamber 548 and through the body 544 of the output valve 540, as will be discussed further below. A seal 560 can be disposed around the piston 556 between the piston 556 and the body 544 so as to prevent air from leaking between the first and second portions 548a, 548b of the actuation chamber 548.

The piston 556 can be configured to translate within the actuation chamber 548 along the longitudinal direction 2. Translation of the piston 556 likewise causes forward and rearward movement of the first and second needles 566a, 566b along the longitudinal direction 2. To move the piston 556, and thus the first and second needles 566a, 566b rearward, pressurized air can be provided to the second portion 548b of the actuation chamber 548 through a second air input 564b in fluid communication with the second portion 548b. Specifically, the second air input 564b can extend through the body 544 from the actuation chamber 548 to the outer surface of the body 544, where the second air input 564b can be connected to and receive pressurized air from a pressurized air source. To move the piston 556, and thus the first and second needles 566a, 566b forwards, pressurized air can be provided to the first portion 548a of the actuation chamber 548 through a first air input 564a in fluid communication with the first portion 548a. Specifically, the first air input 564a can extend through the body 544 from the actuation chamber 548 to the outer surface of the body 544, where the first air input 564a can be connected to an receive pressurized air from a pressurized air source. The cap 552 can function to limit the rearward movement of the piston 556, while the body 544 can function to limit the forward movement of the piston 556. Though forward and rearward movement of the piston 556 in the depicted embodiment occurs due to pressurized air, in other embodiments other mechanisms can be utilized, such as springs.

Opposite the actuation chamber 548, the body 544 of the output valve 540 can define first and second material chambers 582a, 582b. A first passage 568a can extend from the actuation chamber 548 to the first material chamber 582a, where the first needle 566a is configured to extend from the piston 556, through the second portion 548b of the actuation chamber 548, through the first passage 568a, and through the first material chamber 582a. A seal 569a can be disposed around the first needle 566a at the rearward end of the first passage 568a, where the seal 569a creates a fluid seal between the first needle 566a and the body 544 while still allowing relative movement between the first needle 566a and the seal 569a. The seal 569a can prevent pressurized air from leaking out of the lower portion 548b of the actuation chamber 548 and into the first passage 568a. A seal 570a can be disposed around the first needle 566a at the forward end of the first passage 568a, where the seal 570a creates a fluid seal around the first needle 566a while still allowing relative movement between the first needle 566a and the seal 570a. The seal 570a can prevent the first material from leaking out of the first material chamber 582a and into the first passage 568a.

Likewise, a second passage 568b can extend from the actuation chamber 548 to the second material chamber 582b, where the second needle 566b is configured to extend from the piston 556, through the second portion 548b of the actuation chamber 548, through the second passage 568b, and through the second material chamber 582b. Though depicted as extending substantially parallel to the first passage 568a, the first and/or second passages 568a, 568b, and thus the first and second needles 566a, 566b, can extend in other directions as desired. A seal 569b can be disposed around the second needle 566b at the rearward end of the second passage 568b, where the seal 569b creates a fluid seal between the second needle 566b and the body 544 while still allowing relative movement between the second needle 566b and the seal 569b. The seal 569b can prevent pressurized air from leaking out of the lower portion 548b of the actuation chamber 548 and into the second passage 568b. A seal 570b can be disposed around the second needle 566b at the forward end of the second passage 568b, where the seal 570b creates a fluid seal around the second needle 566b while still allowing relative movement between the second needle 566b and the seal 570b. The seal 570b can prevent the second material from leaking out of the first chamber 568a and into the second passage 568b.

The first material chamber 582a can define the portion of the output valve 540 configured to receive the first material from the output manifold 500. The output valve 540 can include a first input channel 576a configured to partially receive a connector 512, which is also configured to be partially received by the first passage 508a of the output manifold 500. The connector 512 can be configured to provide an interface between the first passage 508a and the first input channel 576a, as well as create a fluid seal between the output manifold 500 and the output valve 540 to prevent leaking of the first material. The first input channel 576a can extend from the outer surface of the body 544 to the first material chamber 582a. As such, the first material enters the output valve 540 through the connector 512 from the first passage 508a, through the first input channel 576a, and into the first material chamber 582a. The first material chambers 582a can be selectively in fluid communication with a first outlet chamber 584a, as well as a first outlet channel 586a that extends from the first outlet chamber 584a to a mixer connector 588 that is configured to attach a static mixer (not shown) to the output valve 540 and provide the first material to the static mixer, as will be described further below. The first material chamber 582a can further be in fluid communication with a flush port 578a that extends from the first material chamber 582a to the outer surface of the body 544 of the output valve 540, where the flush port 578a is configured to provide direct access to the first material chamber 582a in a cleaning operation. During normal operation, the flush port 578a can be sealed by a plug 580a.

Similarly, the second material chamber 582b can define the portion of the output valve 540 configured to receive the second material from the output manifold 500. The output valve 540 can include a second input channel 576b configured to partially receive a connector 516, which is also configured to be partially received by the second passage 508b of the output manifold 500. The connector 516 can be configured to provide an interface between the second passage 508b and the second input channel 576b, as well as create a fluid seal between the output manifold 500 and the output valve 540 to prevent leaking of the second material. The second output channel 576b can extend from the outer surface of the body 544 to the second material chamber 582b. As such, the second material enters the output valve 540 through the connector 516 from the second passage 508b, through the second input channel 576b, and into the second material chamber 582b. The second material chamber 582b can be selectively in fluid communication with a second outlet chamber 584b, as well as a second outlet channel 586b that extends from the second outlet chamber 584b to a mixer connector 588 that is configured to attach a static mixer (not shown) to the output valve 540 and provide the second material to the static mixer, as will be described further below. The second material chamber 582b can further be in fluid communication with a flush port 578b that extends from the second material chamber 582b to the outer surface of the body 544 of the output valve 540, where the flush port 578b is configured to provide direct access to the second material chamber 582b in a cleaning operation. During normal operation, the flush port 578b can be sealed by a plug 580b.

To control flow of the first and second materials from the output valve 540 to the static mixer, the output valve 540 can include seals 574a, 574b, where the seals 574a, 574b are positioned at the forward end of the first and second material chambers 582a, 582b, respectively. The seal 574a can be positioned within the first material chamber 582a opposite the seal 570a, and can be spaced from the seal 570a by a spacer 572a, where the spacer 572a can function to maintain a specified distance between the seals 570a, 574a. Similarly, the seal 574b can be positioned within the second material chambers 582b opposite the seal 570b, and can be spaced from the seal 570b by a spacer 572b, where the spacer 572b can function to maintain a specified distance between the seals 570b, 574b.

The first and second needles 566a, 566b can be designed so as to control the flow of the first and second materials to the first and second outlet channels 586a, 586b, respectively, through selective engagement with the lip seals 574a, 574b. Specifically, the first needle 566a can define a first portion 590a configured to attach to the piston 556 and extend through the first passage 568a, narrow portion 592a extending from the first portion 590a, and a valve portion 594a extending from the narrow portion 592a and opposite the first portion 590a. Likewise, the second needle 566b can define a first portion 590b configured to attach to the piston 556 and extend through the second passage 568b, a narrow portion 592b extending from the first portion 590b, and a valve portion 594b extending from the narrow portion 592b and opposite the first portion 590b. In operation, the first and second needles 566a, 566b are configured to translate between a first position and a second position. To move the first and second needles into the first position, pressurized air is provided to the second portion 548b of the actuation chamber 548 through the second air input 564b, which causes the piston 556 to move rearwards through the actuation chamber 548. As a result, the first and second needles 566a, 566b are moved rearwards until the valve portions 594a, 594b of the first and second needles 566a, 566b engage the seals 574a, 574b, respectively. As such, in the first position, the first and second materials are prevented from flowing from the first and second material chambers 582a, 582b to the static mixer.

To move the first and second needles 566a, 566b into the second position, pressurized air is provided to the first portion 548a of the actuation chamber 548, which forces the piston 556 to move forwards within the actuation chamber 548. As a result, the first and second needles 566a, 566b are moved forwards, causing the valve portions 594a, 594b of the first and second needles 566a, 566b to be positioned within the first and second outlet chambers 584a, 584b, respectively, and the narrow portions 592a, 592b of the first and second needles 566a, 566b to be laterally aligned with the seals 574a, 574b, respectively. This smaller relative diameter of the narrow portions 592a, 592b provides a clearance between the seals 574a, 574b and the first and second needles 566a, 566b, thus allowing the first and second materials to pass therebetween. As such, in the second position, the first and second materials are permitted to flow from the first and second material chambers 582a, 582b to the static mixer. Though the depicted output valve 540 includes operatively connected first and second needles 566a, 566b, such that the first and second needles 566a, 566b are configured to transition between the first and second positions simultaneously, it is contemplated that in other embodiments, the first and second needles 566a, 566b can be transitioned between the first and second positions individually, either through use of an alternatively configured output valve or through use of multiple output valves.

In a dispensing operation, the dispensing system 10 can be utilized to meter and dispense discrete amounts of a first and second material. Initially, the first linear actuator 20a can translate the first metering rod 82 through the metering chamber 130 to a retracted position, in which the second end 82b of the metering rod 82 is disposed within the seal retainer 112. The second linear actuator 20b can similarly translate the second metering rod 92 through the metering chamber 230 to a retracted position, in which the second end 92b of the metering rod 92 is disposed within the seal retainer 212. When the metering rods 82, 92 are in the retracted position, the metering chambers 130, 230 can be unobstructed so as to receive discrete amounts of the first and second materials.

Simultaneous with or after transitioning the metering rods 82, 92 into the retracted position, the input valves 300, 400 can be configured to allow the first and second materials to flow into the metering chambers 130, 230, respectively. To accomplish this, pressurized air can be provided to the lower portion 316b of the actuation chamber 316 of the input valve 300 to an extent that overcomes the downward force applied to the piston 320 by the spring 328. This moves the piston 320 upwards through the actuation chamber 316, and the needle 336 is transitioned from the first position to the second position, such that the valve member 352 is spaced from the valve seat 356. As a result, the first material is permitted to flow from the connector 360 into the material chamber 340, and ultimately the metering chamber 130. Similarly, pressurized air can be provided to the lower portion 416b of the actuation chamber 416 of the input valve 400 to an extent that overcomes the downward force applied to the piston 420 by the spring 428. This moves the piston 420 upwards through the actuation chamber 416, and the needle 436 is transitioned from the first position to the second position, such that the valve member 452 is spaced from the valve seat 456. As a result, the second material is permitted to flow from the connector 460 into the material chamber 440, and ultimately the metering chamber 230.

Once the first metering chamber 130 is filled with the first material and the second metering chamber 230 is filled with the second material, the input valves 300, 400 can be actuated to prevent the first and second materials from flowing into the metering chambers 130, 230, respectively. To accomplish this, the operator of the dispensing system 10 can prevent pressurized air from being provided to the lower portion 316b of the actuation chamber 316 of the input valve 300. As a result, the force applied to the piston 320 by the spring 328 moves the piston 320 downwards through the actuation chamber 316, and the needle 336 is transitioned from the second position to the first position. In the first position, the valve member 352 engages the valve seat 356, and the first material is prevented from flowing into the material chamber 340 from the connector 360. Similarly, the operator of the dispensing system 10 can prevent pressurized air from being provided to the lower portion 416b of the actuation chamber 416 of the input valve 400. As a result, the force applied to the piston 420 by the spring 428 moves the piston 420 downwards through the actuation chamber 416, and the needle 436 is transitioned from the second position to the first position, such that the valve member 452 engages the valve seat 456, and the second material is prevented from flowing into the material chamber 440 from the connector 460.

When the first and second metering chambers 130, 230 are filled with the first and second materials, respectively, the metering rods 82, 92 can be actuated to force the discrete amounts of the first and second materials from the first and second metering chambers 130, 230. In particular, the linear actuator 20a can translate the metering rod 82 forwards through the metering chamber 130 so as to dispense the discrete amount of the first material from the metering chamber 130. Similarly, the second linear actuator 20b can translate the metering rod 92 forwards through the metering chamber 230 so as to dispense the discrete amount of the second material from the metering chamber 230. The first and second materials can thus be forced to flow from the first and second metering chambers 130, 230, through the output manifold 500, and to the output valve 540.

Prior to the metering rods 82, 92 forcing the discrete amounts of the first and second materials to the output valve 540, the first and second needles 566a, 566b of the output valve 540 may be in the first position, in which the valve portions 594a, 594b of the first and second needles 566a, 566b engage the seals 574a, 574b, respectively, thus preventing the first and second materials from flowing to the static mixer. Prior to or simultaneous with the first and second materials being forced to the output valve 540, the first and second needles 566a, 566b can be transitioned to the second position, in which the valve portions 594a, 594b of the first and second needles 566a, 566b are positioned within the first and second outlet chambers 584a, 584b, respectively, and the narrow portions 592a, 592b of the first and second needles 566a, 566b are laterally aligned with the seals 574a, 574b, respectively. As a result, when the first and second needles 566a, 566b are in the second position, clearance between the seals 574a, 574b and the first and second needles 566a, 566b, thus allows the first and second materials to pass therebetween from the first and second material chambers 582a, 582b to the static mixer, which can mix the first and second materials into a substantially homogenous mixture and provide the mixture to a dispenser.

Modularity

Figure 10:
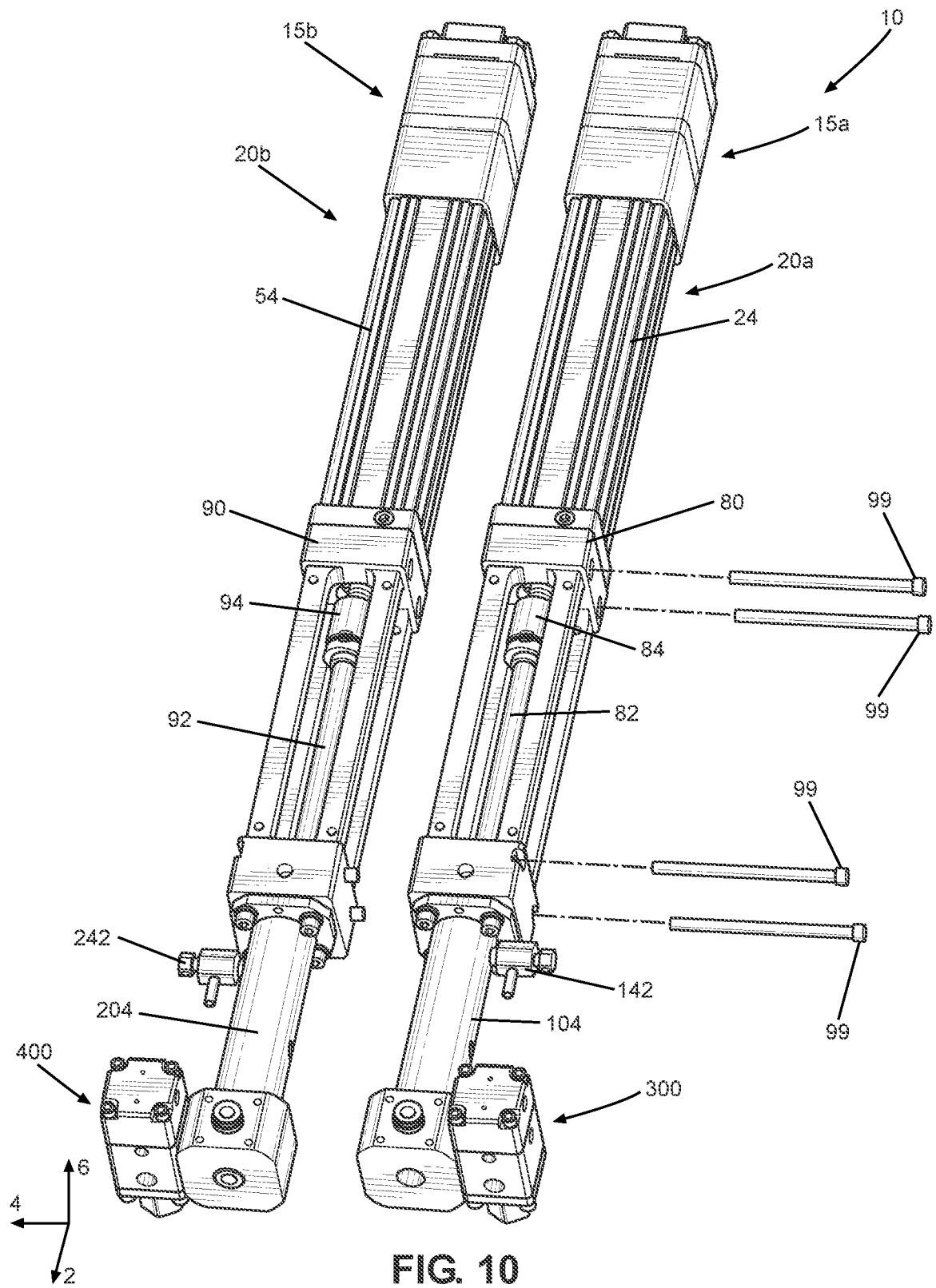
FIG. 10 illustrates a partially exploded view of a portion of the first and second metering systems of the dispensing system shown in FIG. 1.

By combining the first and second metering systems 15a, 15b into a single dispensing system 10, a two-component dispensing system 10 can be utilized to dispense the first and second materials, as opposed to multiple single-component dispensing systems. This allows for an operator to more easily service the dispensing system 10, as well as keep fewer spare parts on hand. Referring to FIG. 10, the first and second metering systems 15a, 15b can be releasably coupled together to define the dispensing system 10. In particular, the housing 80 can be releasably connected to the housing 90, though it is contemplated that other components of the first and second metering systems 15a, 15b can be coupled together as desired. The dispensing system 10 can include a plurality of fasteners 99 that are configured to at least partially extend through the housings 80, 90, so as to couple the housing 80 to the housing 90, and thus the first metering system 15a to the second metering system 15b. In the depicted embodiment, the plurality of fasteners 99 includes four fasteners 99, with two fasteners coupling each end of the housing 80 to a corresponding end of the housing 90. However, more or less fasteners 99 can be utilized as desired. In one embodiment, each of the fasteners 99 are bolts, though other types of fasteners are contemplated, such as screws, rods, etc. Further, it is contemplated that in other embodiments the first and second metering systems 15a, 15b can be coupled to each other through alternative features.

In addition to releasably coupling the first and second metering systems 15a, 15b to each other, the assembly 100 can be releasably coupled to the linear actuator 20a, while the assembly 200 can be releasably coupled to the second linear actuator 20b. As the assemblies 100, 200 define the components of each of the first and second metering systems 15a, 15b through which the first and second materials flow, the ability to detach the assemblies 100, 200 from the linear actuators 20a, 20b, individually or together, allows the operator of the dispensing system 10 to repair, replace, or otherwise service aspects of the assemblies 100, 200 without removing the entire dispensing system 10 from its mounting location. This decreases the complexity of a maintenance operation and the time required to perform a maintenance operation.

Serviceability

Figure 11:
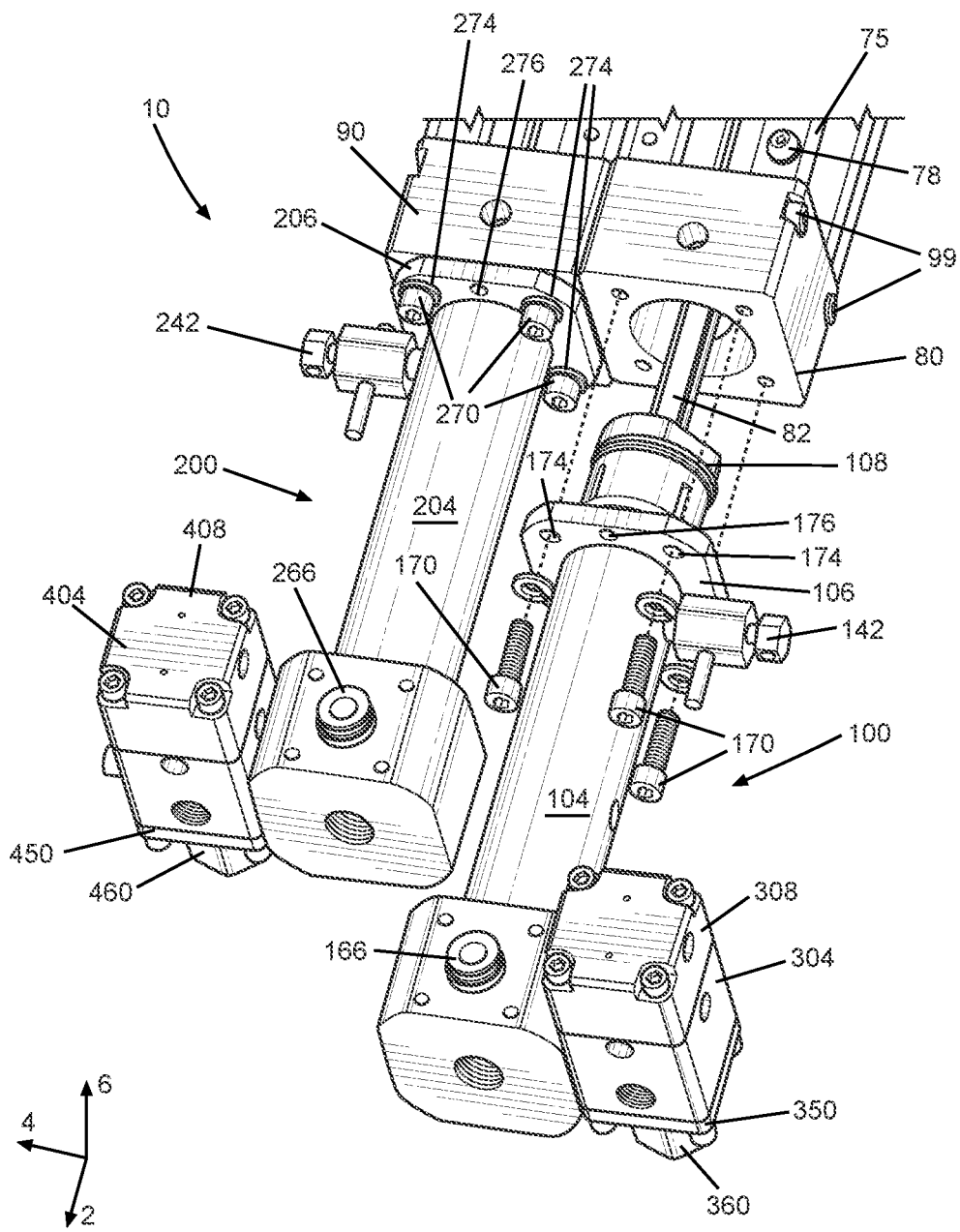
FIG. 11 illustrates a further partially exploded view of the first and second metering systems of the dispensing system shown in FIG. 1.

Referring to FIG. 11, the assembly 100 can be attached to the linear actuator 20a through a plurality of fasteners 170 that extend through corresponding bores 174 of the flange 106 of the housing 104 and couple the housing 104 to the housing 80. To detach the assembly 100 from the linear actuator 20a, the operator can simply loosen the fasteners 170 sufficiently such that the fasteners 170 no longer attach to the housing 80. As depicted, the flange 106 can include additional bores 176 that are not configured to receive a fastener 170. For example, the flange 106 can define at least one additional bore 176 positioned between two bores 174 that are each configured to receive a fastener 170. Once the fasteners 170 have been detached from the housing 80, the additional bore 176 can be configured to receive a fastener 170 so as to contact, but not couple, the fastener 170 to the housing 80. The operator can then use the fastener 170 to push the assembly 100 away from the housing 80 to detach the assembly 100 from the housing 80, and in particular slide the metering rod 82 out of the metering chamber 130 and seal retainer 112. The flange 106 can include any number of additional bores 176 as desired, such as one, two, three, or more than three additional bores 174. Further, a tool (not shown) other than one of the fasteners 170 may be used by the operator to extend through the additional bore 176 and push the assembly away from the housing 80.

Similar to the assembly 100, the assembly 200 can be attached to the second linear actuator 20b through a plurality of fasteners 270 that extend through corresponding bores 274 of the flange 206 of the housing 204 and couple the housing 204 to the housing 90. To detach the assembly 200 from the second linear actuator 20b, the operator can simply loosen the fasteners 270 sufficiently such that the fasteners 270 no longer attach to the housing 90. As depicted, the flange 206 can include additional bores 276 that are not configured to receive a fastener 270. For example, the flange 206 can define at least one additional bore 276 positioned between two bores 274 that are each configured to receive a fastener 270. Once the fasteners 270 have been detached from the housing 90, the additional bore 276 can be configured to receive a fastener 270 so as to contact, but not couple, the fastener 270 to the housing 90. The operator can then use the fastener 270 to push the assembly 200 away from the housing 90 to detach the assembly 200 from the housing 90, and in particular slide the metering rod 92 out of the metering chamber 230 and seal retainer 212. The flange 206 can include any number of additional bores 276 as desired, such as one, two, three, or more than three additional bores 274. Further, a tool (not shown) other than one of the fasteners 270 may be used by the operator to extend through the additional bore 276 and push the assembly away from the housing 90. Though fasteners 170, 270 are specifically described as attaching the assemblies 100, 200 to the linear actuators 20a, 20b, other features can be utilized.

Dual Seals

Figure 12:
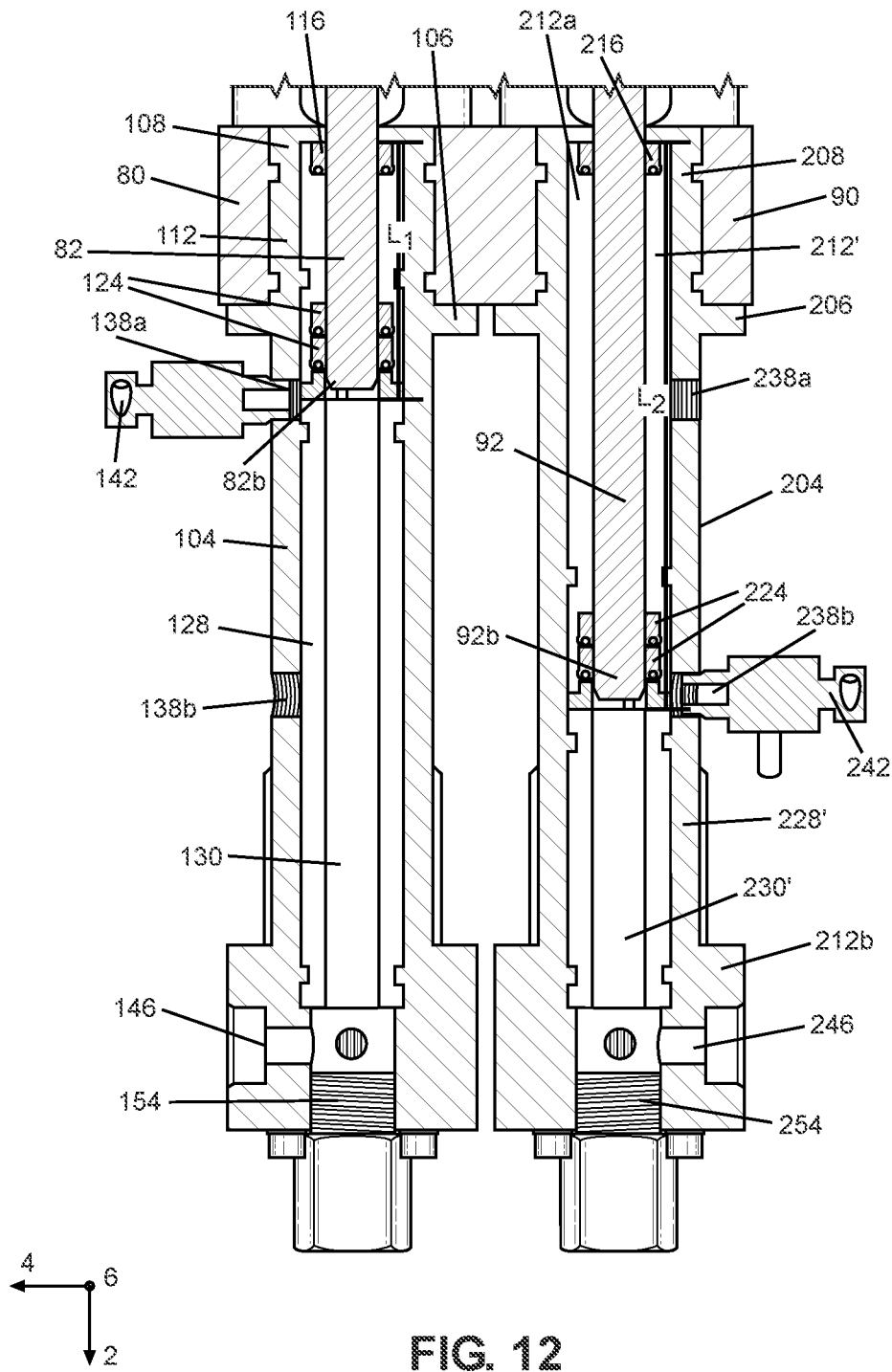
FIG. 12 illustrates a cross-sectional view of portions of a dispensing system according to another embodiment of the present disclosure.

The ability to decouple the assemblies 100, 200 from the linear actuators 20a, 20b, respectively, allows the operator of the dispensing system to easily replace certain components of the assemblies 100, 200 without removing the entire dispensing system 10 from its mounting location. One particular aspect of the assemblies 100, 200 that can be replaced is the seal retainers 112, 212. Referring to FIG. 12, a seal retainer 212' according to another embodiment of the present disclosure will be described. The seal retainer 212' can have similar features to the seal retainer 212 as previously described, and as a result such components will be labeled similarly. The seal retainer 212' can be received within the housing 204 of the assembly 200 and positioned between the sleeve 228' and the cap 208. The seal retainer 212' can be disposed within the housing 204 during an initial setup of the dispensing system 10, or during a maintenance operation in which the assembly 200 is detached from the dispensing system 10, as described above. The seal retainer 212' can extend from a first end 212a to a second end 212b opposite the first end 212a along the longitudinal direction 2. In particular, the seal retainer 212' can be in direct contact with the cap 208 at the first end 212a and the sleeve 228' the second end 212b. As a result, the cap 208 and sleeve 228' can prevent the seal retainer 212' from moving within the housing 204 once the cap 208 has been securely attached to the housing 204. When disposed within the housing 204, the metering chamber 230' can extend from the seal retainer 212' to the outlet passage 250.

The seal retainer 212' can define a central passage 214 configured to allow the metering rod 92 to extend therethrough, such that the metering rod 92 can extend through the housing 54, through the seal retainer 212', and into the metering chamber 230'. The central passage 214 can be sized such that the metering rod 92 is permitted to freely move linearly through the seal retainer 212' along the longitudinal direction 2. At the first end 212a, the seal retainer 212' can be configured to receive a seal 216 that extends around the metering rod 92 so as to create a fluid seal with the metering rod 92. The seal 216 can prevent air from the housing 54 from entering the metering chamber 230' through and/or around the seal retainer 212. At the opposite end, the second end 212b of the seal retainer 212' can be configured to receive two seals 224 that, like the seal 216, extend around the metering rod 92 so as to create a fluid seal with the metering rod 92. The seals 224 can prevent the first material from exiting the metering chamber 230' through the central passage 214 of the seal retainer 212' or around the seal retainer 212'. Though shown as receiving a single seal 216 at the first end 212a and two seals 224 at the second end 212b, each of the first and second ends 212a, 212b of the seal retainer 212' can receive more or less seals than shown. Further, in embodiments utilizing the seal retainer 212', the bleed valve 242 can be disposed within the forward bore 238b so as to be positioned adjacent the second end 212b of the seal retainer 212.

As shown in FIG. 12, in contrast with the seal retainer 212, the seal retainer 212' can define a second length $L_2$ measured along the longitudinal direction 2. The first and second lengths $L_1$, $L_2$ are different, and thus the first and second metering chambers 130, 230' are differently sized. By using a differently sized seal retainer 112, 212', the operator of the dispensing system 10 can adjust the size of the metering chamber 130, 230', and thus the volume of the material received by the metering chamber 130, 230' and forced to the output valve 540 by the metering rod 82, 92. As depicted, the second length $L_2$ can be about double the first length $L_2$, such that that the metering chamber 230' is about half the size of the metering chambers 130, 230. Accordingly, the discrete amount of material dispensed by an assembly utilizing the seal retainer 212' can be about half of the discrete amount of the material dispensed by an assembly utilizing the seal retainers 112, 212. Though seal retainers 112, 212 having a first length $L_1$ and a seal retainer having a second length $L_2$ are shown, a dispensing system 10 can include seal retainers having various other lengths. For example, the dispensing system 10 can include seal retainers having lengths less than the second length $L_2$ or greater than the second length $L_2$, depending on the volume of the material required to be dispensed by the dispensing system 10.

Single Linear Actuator

Figure 13:
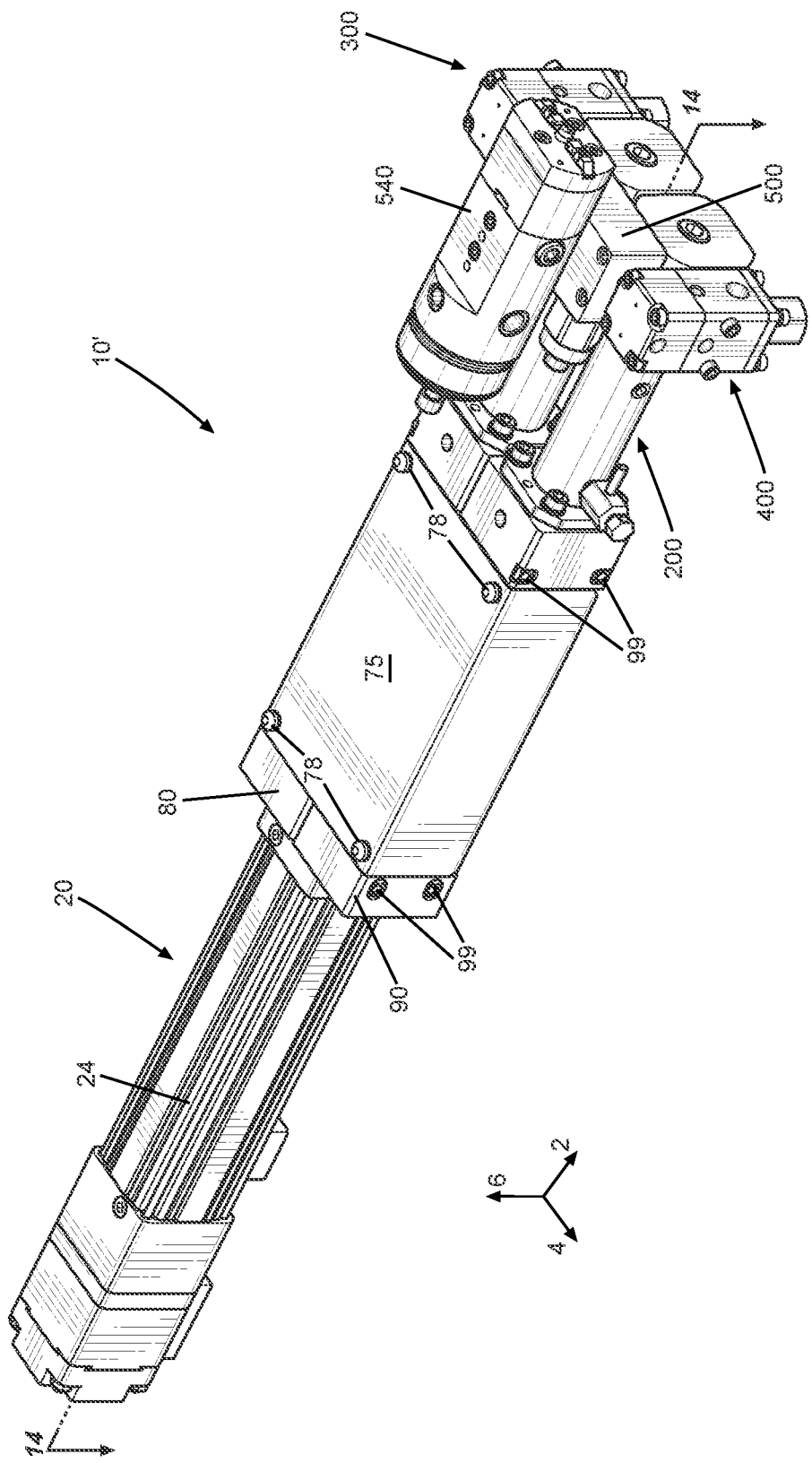
FIG. 13 illustrates a perspective view of a dispensing system according to another embodiment of the present disclosure.
Figure 14:
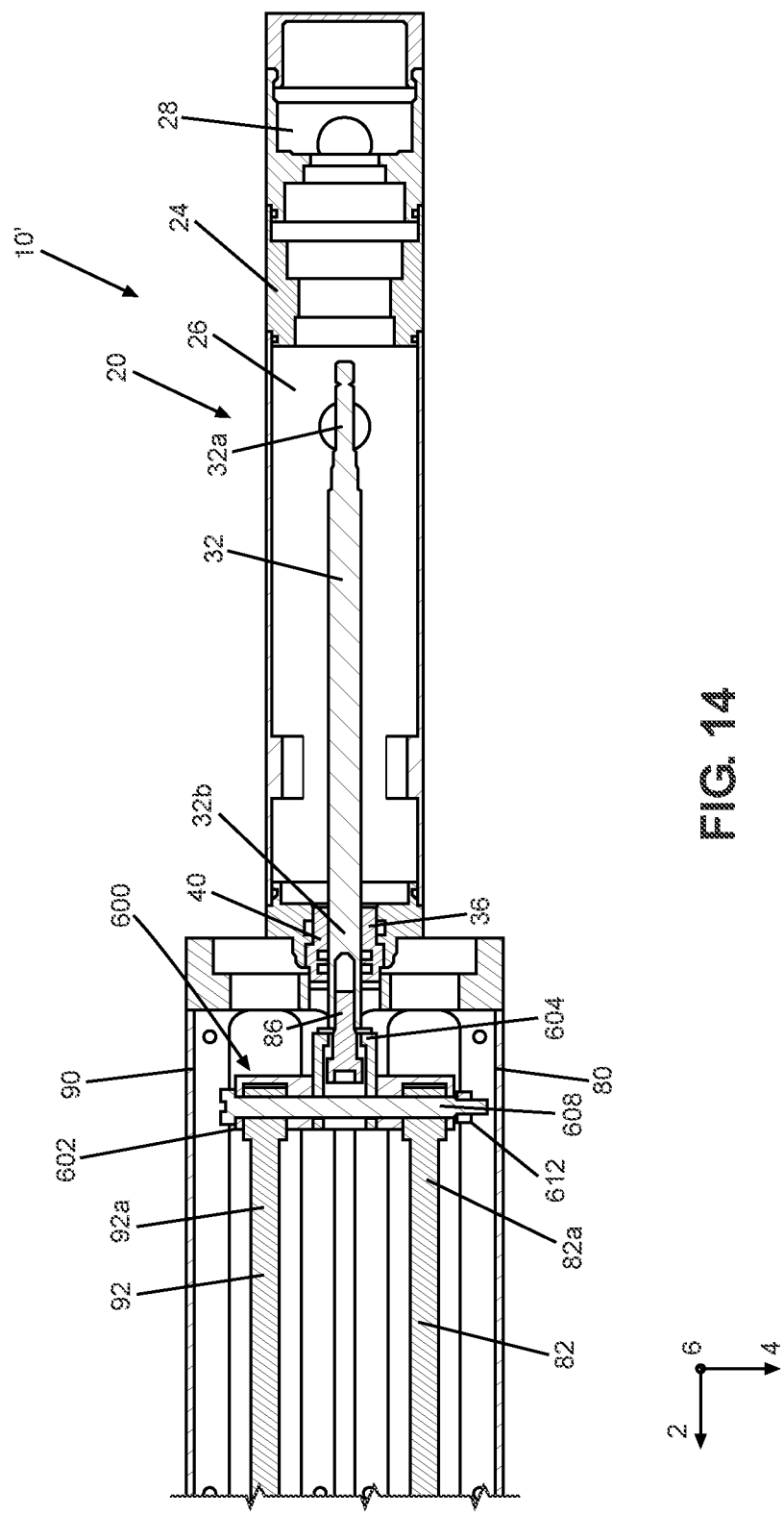
FIG. 14 illustrates a cross-sectional view of a portion of the dispensing system shown in FIG. 13, taken along line 14-14 shown in FIG. 13.

Now referring to FIG. 13, another embodiment of a dispensing system 10' will be shown. The dispensing system 10' contains may similarities to the dispensing system 10, and as such corresponding features will be similarly labeled. The dispensing system 10' can include a single linear actuator 20 configured to linearly translate both metering rods 82, 92, as will be described further below. The linear actuator 20 can include a housing 24 that extends from a first end 24a to a second end 24b opposite the first end 24a along the longitudinal direction 2. The housing 24 can be substantially hollow, such that the housing 24 defines a cavity 26 configured to contain the operational components of the linear actuator 20. For example, an actuation module 28 of the linear actuator 20 can be disposed within the cavity 26 of the housing 24 at the first end 24a. The actuation module 28 can comprise any suitable type of linear actuation device, such as a planetary ball screw, non-planetary ball screw, hydraulic cylinder, pneumatic cylinder, rack and pinion, etc. A rod 32 can extend from the actuation module 28, such that that actuation module 28 is configured to linearly translate the rod 32 along the longitudinal direction 2. The rod 32 can extend along the longitudinal direction 2 from a first end 32a to a second end 32b opposite the first end 32a along the longitudinal direction 2. The rod 32 can be attached to the actuation module 28 at the first end 32a, whereas the second end 32b of the rod 32 can be operably attached to the metering rods 82, 92. The second end 24b of the housing 24 can define a passage 36 extending therethrough, where the passage 36 can extend substantially along the longitudinal direction 2. A bearing 40 can be disposed within the passage 36, and the rod 32 can extend through the bearing 40. The bearing 40 can be configured to guide the rod 32 and enable linear movement of the rod 32 along the longitudinal direction 2.

A coupling assembly 600 can be disposed at the second end 32b of the rod 32 and can be configured to attach the rod 32 to the first and second metering rods 82, 92. The coupling assembly 600 can include a first coupling member 602 configured to attach to the first and second metering rods 82, 92, and a second coupling member 604 configured to attach to the rod 32. To attach the first coupling member 602 to the first and second metering rods 82, 92, the coupling assembly 600 can include a coupling bolt 608 configured to extend laterally through the first and second metering rods 82, 92, as well as the first coupling member 602. The coupling bolt 608 can also extend through the second coupling member 604 so as to couple the first and second coupling members 602, 604 together. To secure the coupling bolt 608 in place, one end of the coupling bolt 608 can threadedly engage a nut 612. The fastener 86 can be utilized to couple the second coupling member 604 to the rod 32. By coupling the rod 32 of the linear actuator 20 using the coupling assembly 600, the linear actuator can be configured to simultaneously translate the first and second metering rods 82, 92 through the first and second metering chambers 130, 230, respectively.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A dispensing system, comprising:
    a first metering system, comprising:
        a first housing;
        a first metering rod at least partially disposed within the first housing;
        a first assembly defining a first metering chamber and releasably connected to the first housing, wherein the first metering rod is configured to linearly translate through the first metering chamber so as to dispense a discrete amount of a first material from the first metering chamber; and
    a second metering system, comprising:
        a second housing;
        a second metering rod at least partially disposed within the second housing; and
        a second assembly defining a second metering chamber and releasably connected to the second housing, wherein the second metering rod is configured to linearly translate through the second metering chamber so as to dispense a discrete amount of a second material from the second metering chamber,
    wherein:
        the first metering system is releasably connected to the second metering system,
        the first assembly further comprises a third housing defining a first inlet passage configured to provide the first material to the first metering chamber and a first outlet passage configured to receive the first material from the first metering chamber,
        the second assembly further comprises a fourth housing defining a second inlet passage configured to provide the second material to the second metering chamber and a second outlet passage configured to receive the second material from the second metering chamber,
        the first metering system includes a first linear actuator attached to the first metering rod and configured to translate the first metering rod through the first metering chamber, and
        the second metering system includes a second linear actuator attached to the second metering rod and configured to translate the second metering rod through the second metering chamber.

2. The dispensing system of claim 1, wherein the first housing is releasably connected to the second housing.

3. The dispensing system of claim 1, further comprising:
    a plurality of fasteners configured to releasably connect the first housing to the second housing.

4. The dispensing system of claim 1, wherein the third housing defines a first flange extending outwards from the third housing, and the first metering system comprises a first plurality of fasteners configured to extend through the first flange and couple the third housing to the first housing,
    wherein the fourth housing defines a second flange extending outwards from the fourth housing, and the second metering system comprises a second plurality of fasteners configured to extend through the second flange and couple the fourth housing to the second housing.

5. The dispensing system of claim 4, wherein the first flange defines a first bore positioned between two of the first plurality of fasteners, wherein the first bore is configured to receive a tool such that the tool contacts the first housing and pushes the first assembly away from the first housing,
    wherein the second flange defines a second bore positioned between two of the second plurality of fasteners, wherein the second bore is configured to receive a tool such that the tool contacts the second housing and pushes the second assembly away from the second housing.

6. The dispensing system of claim 1, wherein the first metering system further comprises a first seal retainer defining a first length along a longitudinal direction, wherein the first seal retainer is configured to receive at least one seal and is disposed within the third housing, wherein the first metering rod extends through the first seal retainer and the first metering chamber extends from the first seal retainer to the first outlet passage,
    wherein the second metering system further comprises a second seal retainer defining a second length along the longitudinal direction, wherein the second seal retainer is configured to receive at least one seal and is disposed within the fourth housing, wherein the second metering rod extends through the second seal retainer and the second metering chamber extends from the second seal retainer to the second outlet passage.

7. The dispensing system of claim 6, wherein the first and second lengths are equal, and the first and second metering chambers are equally sized.

8. The dispensing system of claim 6, wherein the first and second lengths are different, and the first and second metering chambers are differently sized.

9. The dispensing system of claim 8, wherein the third housing defines a first rearward bore and a first forward bore positioned between the first rearward bore and the first outlet passage along the longitudinal direction, the first metering system further including a first bleed valve received by the first rearward bore,
    wherein the fourth housing defines a second rearward bore and a second forward bore positioned between the second rearward bore and the second outlet passage along the longitudinal direction, the second metering system further including a second bleed valve received by the second rearward bore.

10. The dispensing system of claim 1, wherein the first assembly further comprises a first input valve attached to the third housing, wherein the first input valve is configured to selectively provide the first material to the first inlet passage, wherein the second assembly further comprises a second input valve attached to the fourth housing, wherein the second input valve is configured to selectively provide the second material to the second inlet passage.

11. The dispensing system of claim 10, wherein the first input valve includes a first valve seat and a first needle having a first valve member, wherein the first needle is configured to translate between a first position, where the first valve member contacts the first valve seat and the first material is prevented from flowing to the first metering chamber, and a second position, where the first valve member is spaced from the first valve seat and the first material is permitted to flow to the first metering chamber,
wherein the second input valve includes a second valve seat and a second needle having a second valve member, wherein the second needle is configured to translate between a first position, where the second valve member contacts the second valve seat and the second material is prevented from flowing to the second metering chamber, and a second position, where the second valve member is spaced from the second valve seat and the second material is permitted to flow to the second metering chamber.

12. The dispensing system of claim 1, further comprising:
an output manifold releasably attached to the first assembly and the second assembly, the output manifold defining a first passage configured to receive the first material from the first outlet passage and a second passage configured to receive the second material from the second outlet passage; and
an output valve connected to the output manifold, wherein the output valve is configured to receive the first and second materials from the output manifold and selectively provide the first and second materials to a static mixer.

13. The dispensing system of claim 12, wherein the output valve includes first and second seals, a first needle defining a first valve portion, and a second needle defining a second valve portion, wherein the first and second needles are configured to be transitioned between a first position, where the first and second valve portions engage the first and second seals, respectively, such that the first and second materials are prevented from flowing to the static mixer, and a second position, where the first and second valve portions are spaced from the first and second seals, respectively, such that the first and second materials are permitted to flow to the static mixer.

14. The dispensing system of claim 13, wherein the first and second needles are operatively connected such that the first and second needles are configured to be transitioned between the first and second positions simultaneously.

15. The dispensing system of claim 12, further comprising:
a first pressure sensor attached to the output manifold and configured to detect a pressure of the first material flowing through the first passage; and
a second pressure sensor attached to the output manifold and configured to detect a pressure of the second material flowing through the second passage.

16. The dispensing system of claim 1, wherein the first and second linear actuators are planetary ball screw linear actuators.

17. The dispensing system of claim 1, further comprising:
a linear actuator attached to the first and second metering rods and configured to simultaneously translate the first and second metering rods through the first and second metering chambers, respectively.

18. The dispensing system of claim 17, wherein the linear actuator comprises an actuation module and a rod extending from the actuation module, wherein the actuation module is configured to linearly translate the rod, wherein the dispensing system further comprises:
a coupling assembly configured to attach the rod to the first and second metering rods.

19. The dispensing system of claim 1, further comprising an input valve configured to provide the first material via the first inlet passage, the input valve comprising:
a body;
a cap; and
an actuation chamber defined by the body and the cap.

20. The dispensing system of claim 1, wherein the first metering chamber is configured to receive a portion of the discrete amount of a first material prior to dispensing.

* * * * *